United States Patent Office 2,777,635
Patented Jan. 15, 1957

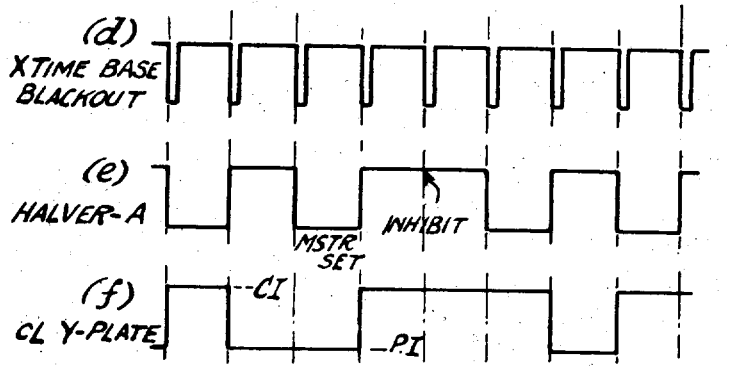

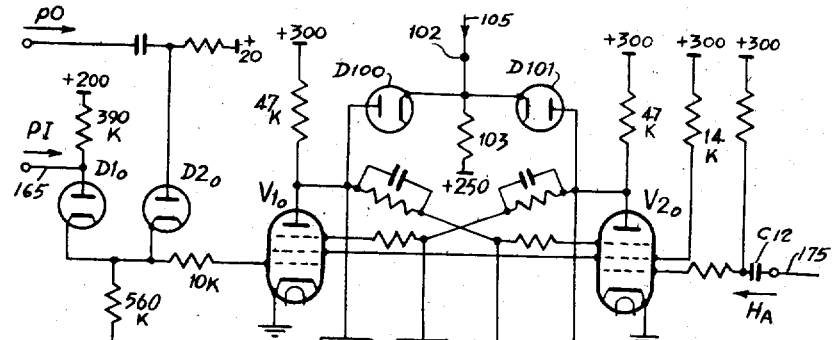
Fig. 3.
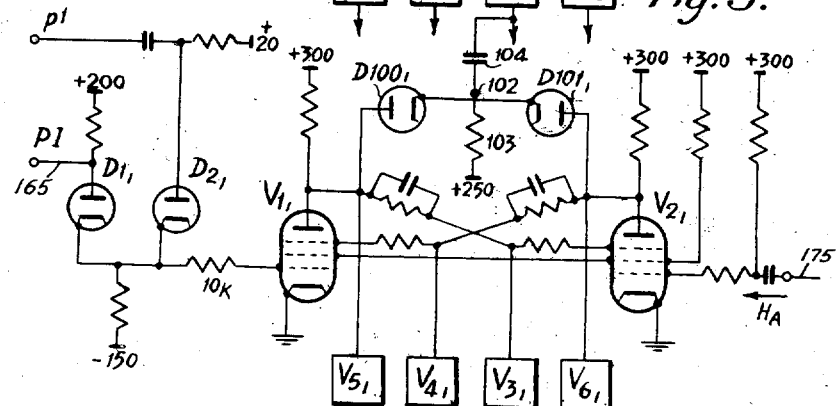
Fig. 4.
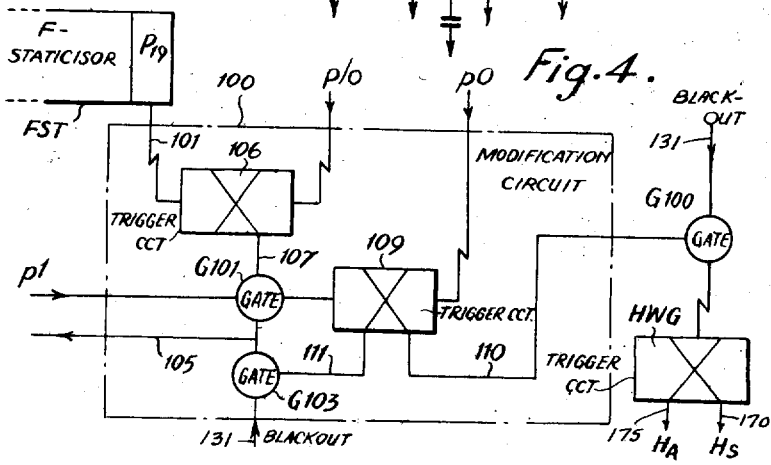
Inventors:
F. C. Williams
T. Kilburn
G. C. Tootill
By Moore and Hall
Attorneys

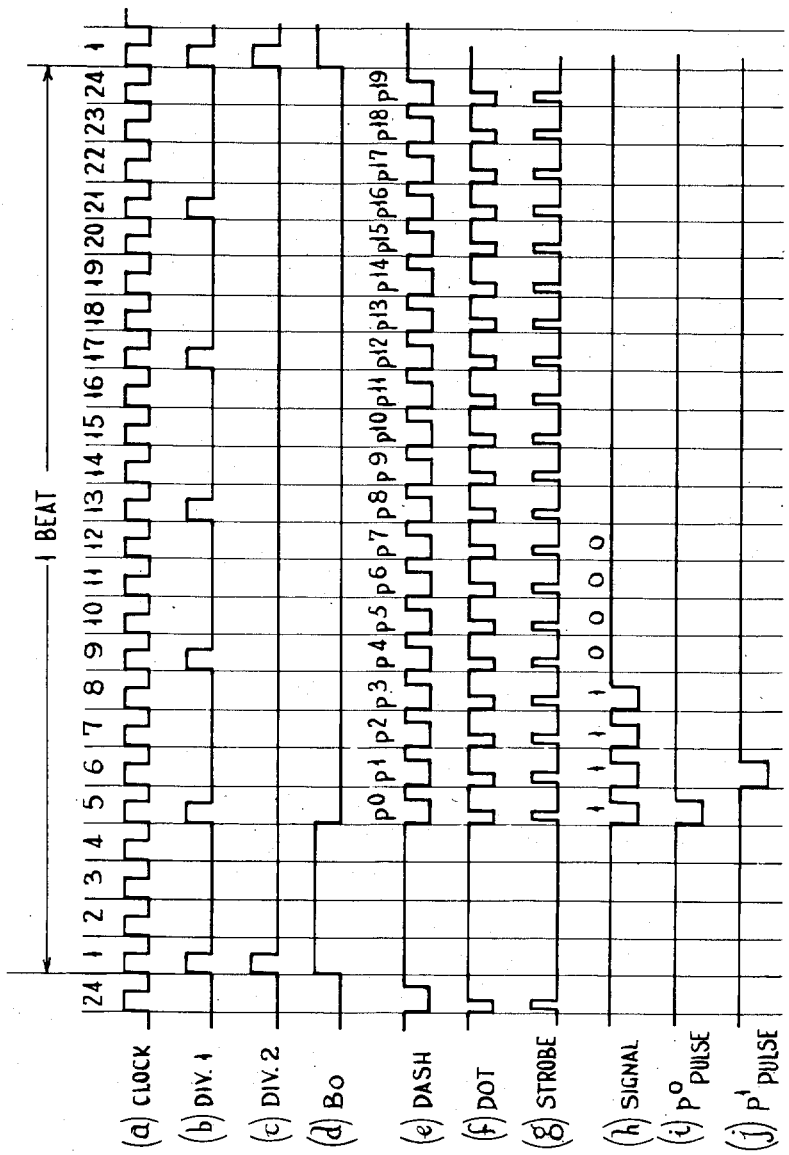

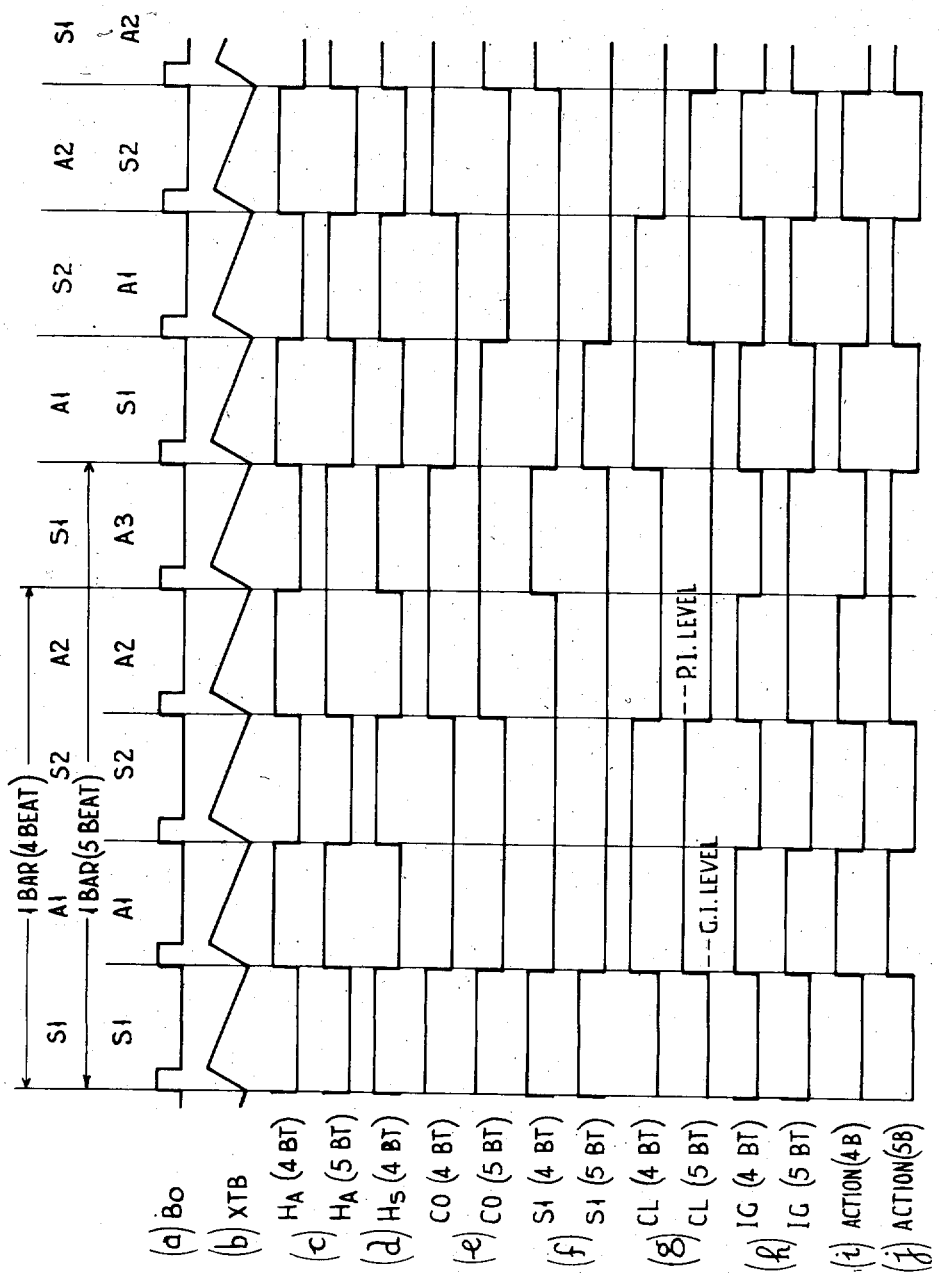

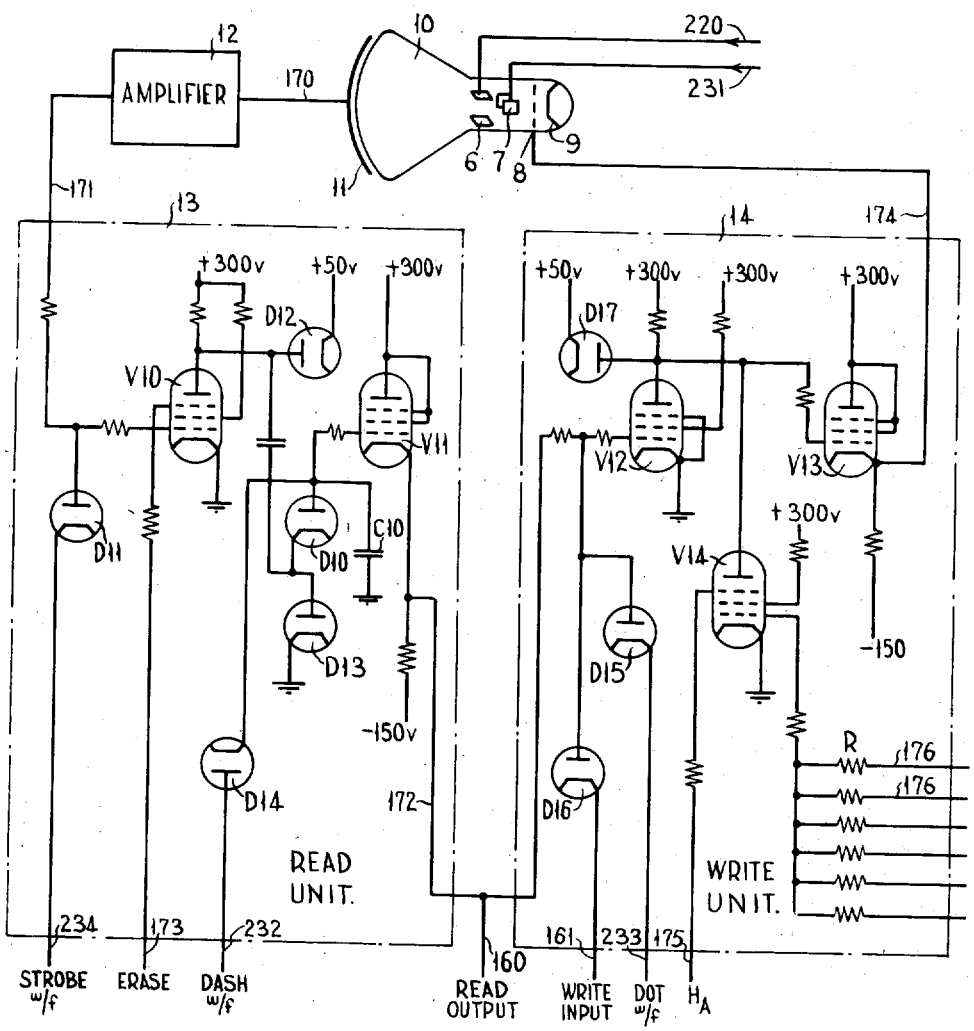

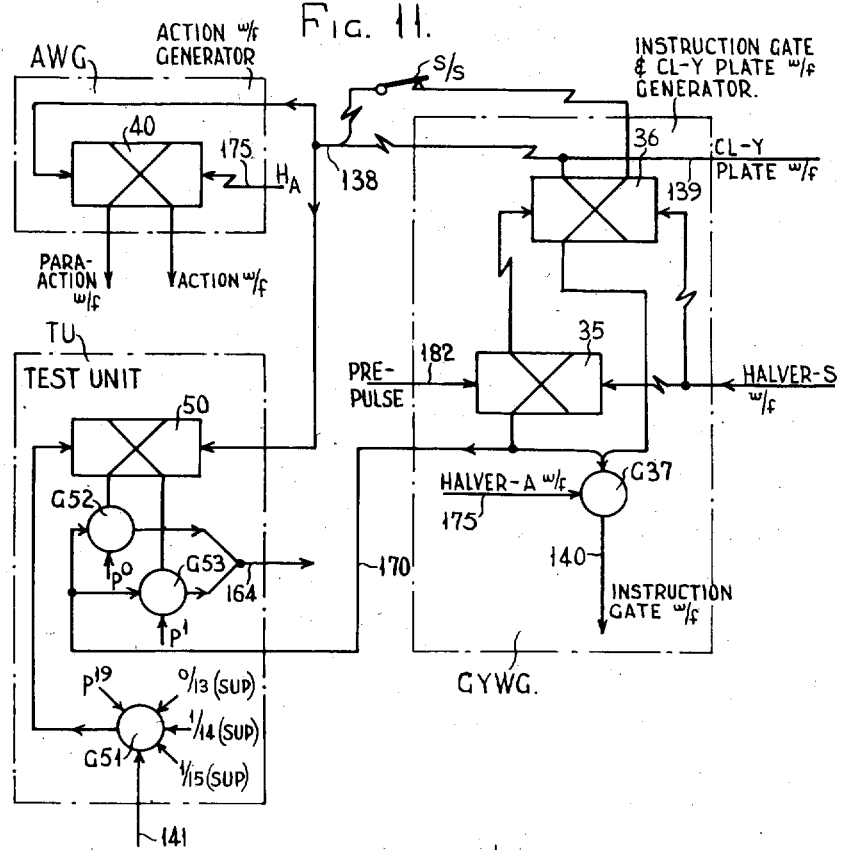
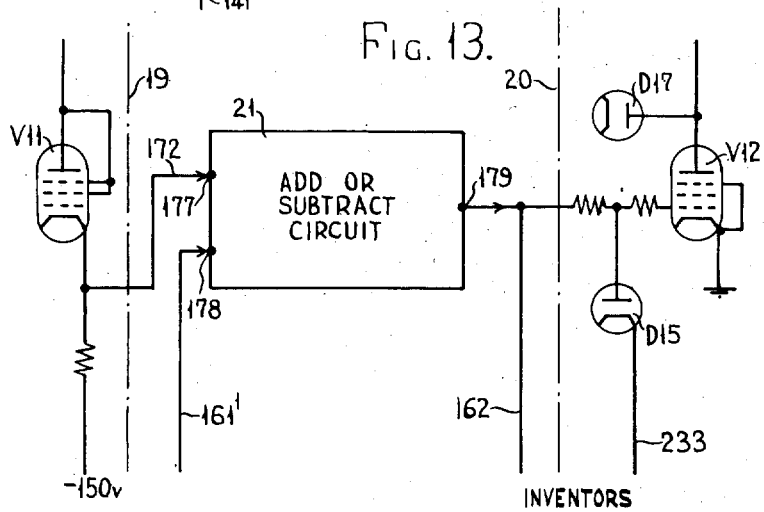

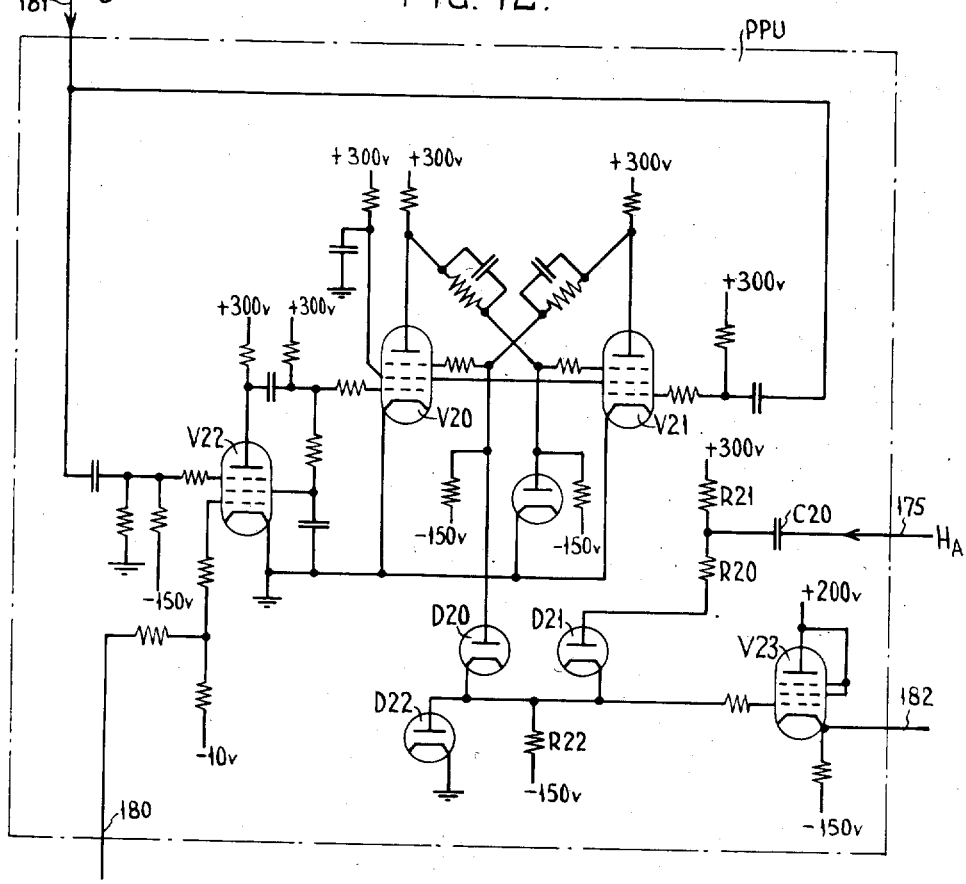

2,777,635

ELECTRONIC DIGITAL COMPUTING MACHINES

Geoffrey Colin Tootill, Shrivenham, near Swindon, Frederic Calland Williams, Timperley, and Tom Kilburn, Manchester, England, assignors to National Research Development Corporation, London, England, a corporation of Great Britain Application August 14, 1950, Serial No. 179,261

Claims priority, application Great Britain August 17, 1949

14 Claims. (Cl. 235—61)

This invention relates to electronic digital computing machines of the type in which the serial form of representation for numbers is used and which employ digital storage or memory devices of the electrostatic type described in the paper by F. C. Williams and T. Kilburn in Proc. I. E. E. Part III, March 1949, pages 81–100 or of any other type of store which may be operated in an analogous fashion.

There are a number of forms of machines of the general type referred to above; for instance, one form of machine employing such electrostatic storage devices operates with binary-digital numbers upon a basic rhythm defined as "four beats in a bar" or in other words, four minor or sub-cycles in each complete operative cycle during which one step of the computing operation program is performed. Another form of machine, while generally similar in operating principles to such four-beat machines, operates with a basic rhythm of only "two beats in a bar."

Such four and two-beat rhythms are dictated by the need to provide, firstly, so-called "scan" beats during which periodical regeneration of all stored data (in the form of so-called number words and instruction words) held upon the cathode ray tube storage devices of the machines and the setting up of the store address-selecting mechanism by which a required one of the multiplicity of stored data items in a store may be made available in the succeeding beat takes place and, secondly, so-called "action" beats during which a transfer or arithmetical operation is performed with the data item previously selected. In these earlier machines such scan and action beats are alternated, so far as the multiple-address storage devices are concerned although, in the two-beat rhythm, the scan and action beats of certain storage devices are interlaced with respect to those of other storage devices to achieve an increased speed. Such gain in speed of the two-beat machine over the four-beat machine is obtained at the cost of increased complexity and the disadvantage that separate stores must be provided for the number words being operated with and the instruction words which control the operations performed with such number words.

The object of the present invention is to provide a machine of the type referred to which operates upon a basic rhythm of either two or four beats in a bar but at a significantly higher speed than the corresponding machines already referred to.

In the above mentioned existing machines the time duration of each beat is determined by the maximum number of digits required in the number words being operated with and the beat interval is fixed at a value which will accommodate a train of electric pulses equal in number to such maximum digit number plus a further period, known as the blackout interval during which flyback of the cathode-ray tube beam takes place. The maximum number of digits required in such number words is determined by mathematical considerations of the types of problems which are to be handled and the degree of accuracy, and hence the number of significant figures, required. A typical number is 40 binary digits.

In such machines however, it is found that the maximum number of digits required in any normal instruction word is unlikely to exceed 20 and may be considerably less than 20. In any beat in which instruction words are concerned a considerable fraction, e. g. half or more, of the beat interval is wasted. Although this two-to-one ratio of instruction word length to number word length can be utilized to effect an economy in storage space by holding two instruction words (having a maximum number of 20 digits each) in each 40 digits storage address location, such an arrangement still suffers from the waste of operating time referred to.

In the above mentioned four-beat type of machine, apart from the matter of regeneration, the first beat of each bar is concerned with the alteration of a short control number already existing in a special control unit store of the machine into a new control number and the use of such number to set up the address selecting mechanism of the main data storage device to the location of the next required instruction word while the second beat is concerned with the reading out of such selected instruction word from the main storage device to another location in the control store, the third beat being concerned with the use of a part of such temporarily stored instruction word, in similar manner to the control number during the first beat, to set up the address selecting mechanism of the main storage device once again, this time to the location of the particular number or other word which is to be dealt with during the current computation step. At the same time, during this third beat, other parts of such instruction word are used to set up the various gate circuits or like routing and operation controls so as to condition the machine in readiness to carry out the particular form of operation, such as addition or multiplication, which is required to be performed with the chosen number or other word. In the fourth and last beat of the bar such selected number or other word is read out from the main storage device and handled in the specified manner. It will thus be seen that only instruction words are being used or obeyed during the first three beats of any bar. In the case of the two-beat machines already referred to the various instruction words are held in a storage device separate from that of the main storage device where the required number words are located and in the first beat of the bar the same short control number already existing in a special control unit store is altered into a new control number and then used to set up the address selecting mechanism of the additional instruction store to the location of the next required instruction word. In the second beat this selected instruction number is read out of the instruction store and used, as in the four beat machine, to set up the address selecting mechanism of the main storage device to the location of the required number word and to condition the machine to perform the desired type of operation during the next following (third) beat which is substantially identical with the fourth beat of the four beat rhythm. There is thus a total of three beats required for each individual computation step but as it is possible to arrange for the first beat of one bar to overlap with the last beat of the preceding bar the effective length is only two beats. With such a two beat rhythm it will be seen that only instruction words are involved in each of the two beats of each bar of operation of the control unit and also in the first of the two beats of each bar of operation of the main storage device and other parts of the machine. The wastage of time is accordingly considerable even if full-length number words are always involved in the remaining beat of each bar.

Study of typical programs of instructions to be obeyed in machines of the type referred to shows that a considerable proportion of the instructions which have to be obeyed during the whole of complete operative cycles or bars are concerned with the transference of words of the magnitude of instruction words. For instance, in a machine which is provided with a so-called "B" tube facility which enables existing instruction words to be modified by numbers fed from an auxiliary "B" tube store, a variety of operations occur which involve the transference from the main store to the control unit during the fourth beat of a bar of words which are only of instruction word length. In such cases the even greater wastage of time will be self-evident.

The above described factors are utilized to obtain an economy of operating time by arranging, in accordance with the present invention, that a computing machine of the type referred to, operates with a beat interval which accommodates a number of digits which is a submultiple, $n$, of the number of digits in the basic length number words utilized in the machine and that transference of or operation with basic length number words, whenever they occur, is effected during $n$ successive beats under the control of a single instruction.

In the simplest and preferred embodiment of the invention, the beat interval is arranged to accommodate one half the number of digits used in the basic length number word.

The invention is applicable to machines which operate upon either the four-beat or the two-beat rhythms already referred to and also to machines which operate upon the three-beat rhythm described in the specification of co-pending application Ser. No. 179,262, filed August 14, 1950, and in which a separate instruction word staticisor is provided and is interconnected, section to section, in parallel with the main store staticisor so that in the first beat of a bar the control number is altered and used, as before, to set up the address selecting sections of the main store staticisor to the location of the next required instruction word which is then read out of the main store during the second beat and applied to the special instruction staticisor where it is held until the end of such beat and then transferred instantaneously to the main store staticisor through the parallel connections so that the latter staticisor is immediately set up again to the location of the desired number in the main store and to condition the machine to perform the desired type of operation which takes place in the subsequent third beat.

In a machine in accordance with the invention each basic length number word will be distributed between a multiplicity of address locations in the main store and, in accordance with a further feature of this invention, provision is made whereby the address or addresses in the main store appropriate to the portion or portions of a basic length number which follow the first portion will be automatically set up on the address selecting mechanism at the conclusion of the transfer of the preceding portion.

In order that the nature of the invention may be more clearly understood, various features and embodiments will now be described with reference to the accompanying drawings in which:

Figure 1 illustrates in tabular form the sequence of events occurring in a four-beat machine embodying the present invention. This figure also illustrates the nature of certain waveforms involved in the operation of the machine.

Figure 3 is a simplified circuit diagram of a modified staticisor arrangement.

Figure 4 is a more detailed block schematic diagram showing certain modifications of the Halver waveform generating arrangement.

Figures 8 and 9 show a series of waveform diagrams illustrating the nature of various operating potentials within the machine.

Figure 10 illustrates in partly schematic and partly detailed circuit form the arrangement of a main storage device of the cathode ray tube type.

Figure 11 illustrates schematically the construction of the instruction gate and CL Y-plate waveform generator, the test unit and the action waveform generator.

Figure 12 illustrates the circuit arrangement of the prepulse generating unit.

Figure 13 illustrates the modifications necessary to a storage device as shown in Figure 10 to form an accumulator device.

Figure 2A:
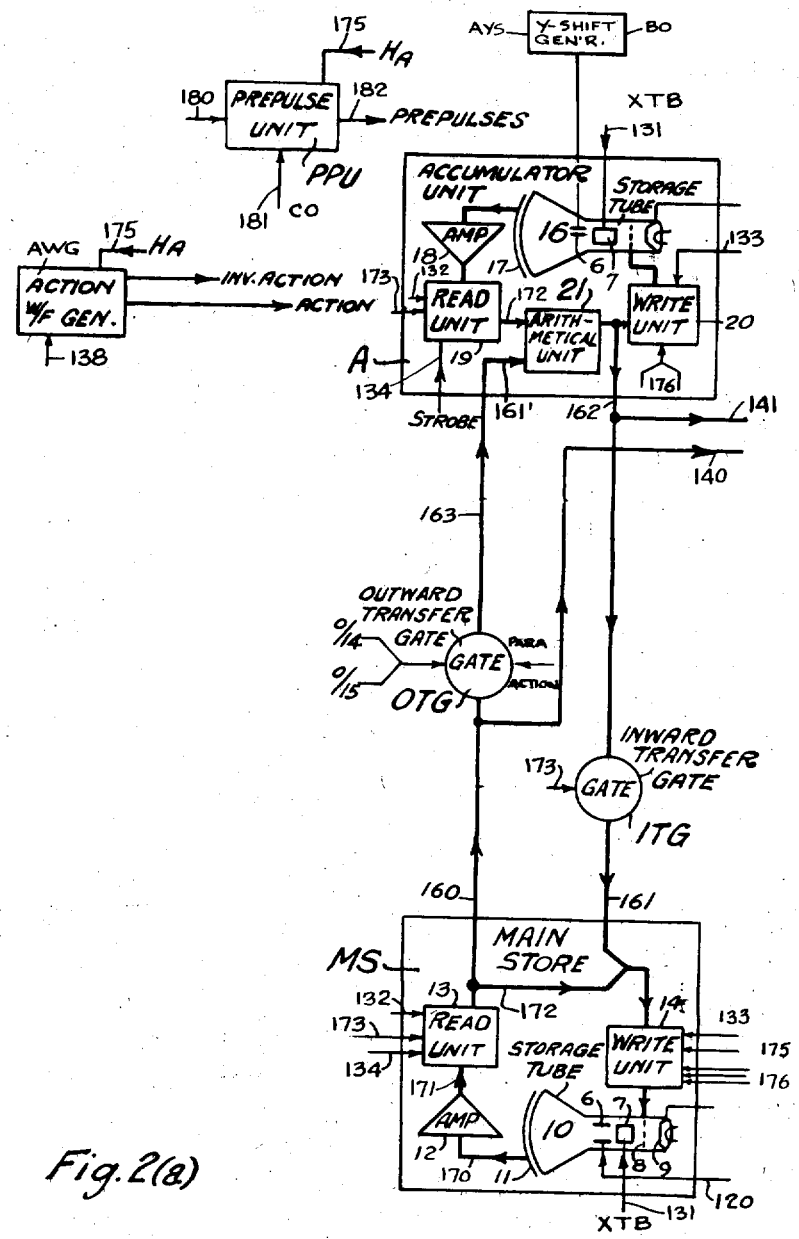
Figures 2a, 2b show, in simplified block schematic form, the principal elements of a four-beat type of machine modified in accordance with the present invention.

Consideration will first be given to the four-beat to the bar rhythm as previously described but wherein each beat accommodates words of only 20 digits length, the instruction words being of 20 digits or less and the number words always containing 40 digits. The time intervals of the four beats of a normal bar, i. e. the first scan beat S1, the first action beat A1, the second scan beat S2 and the second action beat A2 are indicated in Figure 1(a) and during these beats occur the normal operations as previously described. Each operative bar is initiated by a prepulse or starting signal at the instant of commencement of the beat S1.

During the first scan beat S1 the control instruction word $CI+1$ which is formed by adding unity (or 2 in certain special cases) to the instruction word already in existence in the control unit, is fed from the address CI of the control unit store to the main store staticisor which is then set up to select the address of the next present instruction PI.

During the next beat A1 this present instruction PI is read out of the main store and is transferred to the second or PI address of the control unit store. During the next following beat S2, this present instruction PI is read out of the control unit store and is fed to set up the address and function units of the main store staticisor so that the present instruction PI is obeyed by effecting the required word transfer into or out of the main store during the fourth beat A2.

The above description of operation will apply to every complete bar so long as the present instruction PI is one, such as those previously referred to, in which the word involved in the transfer during the fourth beat is of 20 digits length only. If this is so a prepulse signal which initiates the commencement of the next bar will be caused to issue after beat A2 and the next following bar will commence with its first scan beat S1 as indicated in Figure 1(a). If however, the present instruction PI which is being obeyed during S2 of any given bar is one involving the transfer of a 40-digit number word into or out of the main store the sequence of operations in such bar will be as indicated in Figure 1(b). In such modified bar the events occurring during the first three beats S1, A1 and S2 will be the same as those described with reference to Figure 1(a); beat S2, however, will be followed by two successive action beats A2 and A3 during which the first and second 20-digit halves of the single 40-digit number are transferred in succession and the issue of a prepulse to initiate the next following bar will be delayed until the end of beat A3.

The necessary changes within the machine to perform the required extension from four beats to five beats in the bar is effected by providing that portion of the present instruction word PI which is being obeyed during beat S2 with a special digit which is effective upon the function unit of the main store staticisor to define whether or not the operation about to be performed in response to such instruction is one involving a 40-digit word. The function staticisor unit will be set up by this special digit during beat S2 so that necessary modifications to effect the required change from four to five beats can be made in advance of the commencement of the fourth beat A2.

The rhythm described above provides the facility of operating with a basic number length of 40 digits with considerable saving of time as substantially no portions of any beat are occupied with unused digits. The use of the storage space saving device previously referred to in which two instruction words are held in each unique address location of the main store is no longer necessary or applicable and complications involved in the use of this device disappear.

It is common practice in computing machines of the type to which the present invention relates to carry out all, or substantially all, of the actual computing operations on the basis of double length numbers. Thus in a machine which uses a basic number length of 40 digits, computations may be based upon 80-digit numbers, e. g. in order to allow unrestricted multiplication of two 40-digit numbers without loss of any information. When such a mode of operation is applied to a four-beat machine, two conditions may arise. One of these is that in which multiple length numbers are each held in a number of separate addresses in the main store so that each number must be extracted by a plurality of separate instructions utilizing a plurality of operative bars. The other condition is that in which normal length (e. g. 40-digit) numbers are extracted from the main store but become extended to multiple length (e. g. 80 digit) form by addition of a suitable number of repetitions of their most significant digit as they are fed to or dealt with by the arithmetic organ or accumulator.

Such extension process as described under the last condition does not interfere with the normal four-beat rhythm as the operations taking place within the accumulator do not depend upon and need not interfere with the operation of the rest of the machine during the first beats of a bar so that the extended computation produced in consequence of one operative bar may, if necessary, overlap the commencement of the succeeding bar.

This overlap principle may be applied to the five-beat machine of the present invention in the manner illustrated in Figure 1(c) which shows the sequence of events occurring when a 40-digit number is extracted from the main store during beats A2 and A3 and is extended during computation to 80-digit form. The beats S1, A1, S2, A2 and A3 are exactly as already described for the condition illustrated in Figure 1(b) and the prepulse signal to commence the next following bar is given at the end of beat A3 as before. The interval occupied by the extension to 80-digit form of the 40-digit number occurs during beats S1 and A1 of the next bar. During such beats of the next bar, the computation processes associated with the accumulator and initiated during the preceding bar are occurring while the normal extraction process of the new present instruction PI for the next bar will occur simultaneously since these processes involve only the control and main store sections of the machine.

Figure 2B:
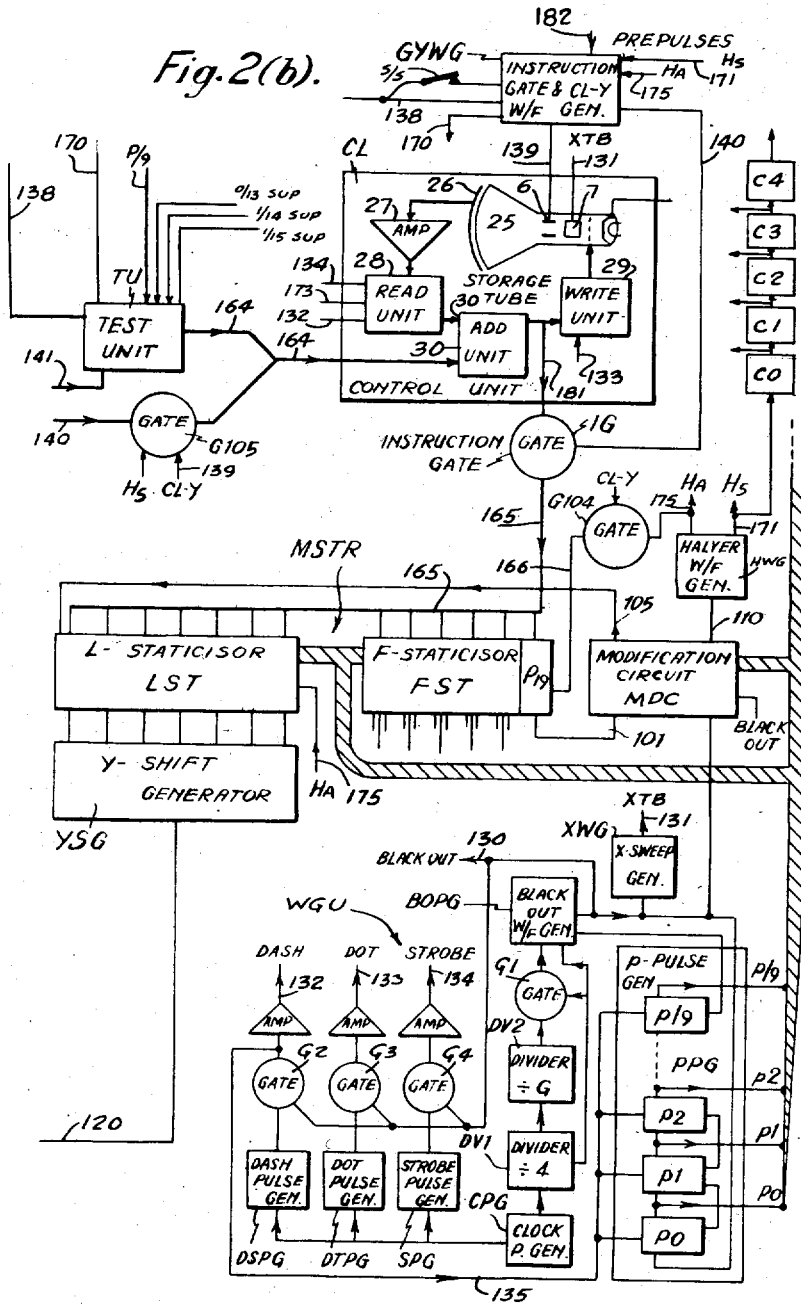

The machine shown in Figures 2a and 2b comprises, broadly, a main data item store MS for recording both number and instruction-representing signals, an accumulator or computing unit A in which an arithmetical operation, such as addition or subtraction, is carried out with number-representing signals, a control unit CL which controls the selection of the required instructions from the main store MS in order to carry out a desired predetermined programme of computation steps and the subsequent obeying of those instructions, a main store staticisor MSTR which serves to convert a dynamic form pulse train signal into a series of static control potentials, and which consists of an address selecting or L-staticisor unit LST and a function or F-staticisor unit FST, a test unit TU which, when required examines an applied pulse signal train to determine the signalled value of the sign-representing digit thereof and, in accordance with the result of such test, controls a subsequent instruction selecting operation, a prepulse unit PPU which generates the starting signal initiating the commencement of each operative bar, an action waveform generator AWG, a halver waveform generator HWG, an instruction gate and CL-Y waveform generator GYWG, a modification circuit MDC, timing means WGU in the form of a plurality of waveform generator units for providing the requisite waveforms for controlling the operating rhythm of the machine and various transfer route controlling gates such as the inward and outward transfer gates OTG and ITG and the instruction gate IG which will be referred to in greater detail later.

As the machine is fundamentally controlled throughout by the various waveforms generated in the unit WGU, the latter will first be described at some detail. This timing means WGU comprises a master or clock oscillator CPG which operates at a stable frequency of 100 kc./s., and provides a squared-pulse output, known as the Clock waveform shown in Fig. 8a. This waveform comprises a square pulse once every 10 microseconds and is applied to a pulse dividing or counting circuit DV1 of any suitable form, e. g. of the so-called phantastron type, which divides by a factor of four to provide an output waveform DIV1 consisting of a pulse coincident with every fourth input pulse as shown in Fig. 8b. The output from this dividing circuit DV1 is supplied to a second and similar pulse dividing circuit DV2 which divides by a factor of six to provide the DIV2 waveform of Fig. 8c consisting of a pulse coincident with every 24th clock pulse. The pulses of this DIV2 waveform serve to define the above described minor cycle or beat intervals of the machine rhythm.

Each beat contains a total of 20 operative or digit-representing Clock intervals for signalling respectively the digit coefficient values of 20 successive binary digits of ascending power value. Thus the first operative digit intervals, known as the p0 interval, may represent the binary power $2^0$, the second interval, p1, the binary power $2^1$ and the last or 20th interval, p19, the binary power $2^{19}$. In addition to these 20 operative digit intervals, each beat consists of a further four Clock intervals for accommodating the fly-back motion of the storage tube beam necessary at the end of each storage line or X-scanning motion as described in the aforesaid paper. To define this fly-back or Blackout period during each beat the output from the circuit DV2 is applied through an "and" type gate G1 as a triggering input to a two-stable-state electronic trigger circuit BOPG. This trigger circuit may be of any convenient type, e. g. of the so-called Eccles-Jordan type, having separate controlling inputs for altering its condition to one, the triggered, state and to the other, the reset, state. An example of a suitable circuit is that shown in "Time Bases" by O. S. Puckle (Chapman and Hall), 1944, page 54, with the difference that separate control potentials are applied to each of the control grids of the two cross-connected valves instead of having each control grid supplied in parallel from a single source as shown in that reference. This trigger circuit BOPG generates the Blackout waveform, shown in Fig. 8d, comprising a pulse lasting from the instant when the circuit is triggered by the output pulse from the divider DV2 until the circuit is reset by the next output pulse from divider DV1, four digit intervals later, whereby the Blackout pulse persists over the first four Clock intervals of each 24 interval beat period. The remaining 20 Clock intervals before the next Blackout pulse constitute the 20 operative or digit-representing intervals of each beat as previously mentioned. This Blackout waveform is made available throughout the machine over busbar 130.

The Clock waveform is also applied as a triggering medium to three squared-pulse generators DSPG, DTPG and SPG. These generators are of any suitable form conveniently of the mono-stable trigger circuit type whereby, after triggering to their unstable state, they generate a square pulse of predetermined time duration before reverting to their normal stable state in readiness for receiving the next triggering impulse. A suitable circuit is shown in Fig. 24, page 49 of the aforesaid text book "Time Bases" by O. S. Puckle. The pulse generator DS/PG provides a pulse of 6 microseconds duration subsequent to each triggering input pulse, and its output is applied through an "and" type gate G2 and thence to an amplifier of any suitable form, the output from which, supplied throughout the machine on busbar 132, constitutes the Dash waveform of Fig. 8e. The gate G2 is controlled by the Blackout waveform (Fig. 8d) to be closed during the Blackout pulse period, whereby the resultant Dash waveform thus consists of a series of negative-going 6 microsecond pulses, one during each of the 20 operative digit intervals p0, p1—p19 of each beat period. The pulse generator DTPG is of similar form to the Dash pulse generator DSPG except that it provides a shortened pulse output of some 2 microseconds duration following each triggering input. The output from this pulse generator is fed through an "and" type gate G3 which is also controlled by the Blackout waveform and thence to an amplifier whose output, available throughout the machine on busbar 133, constitutes the Dot waveform of Fig. 8f. This Dot waveform thus comprises a series of 2 microsecond negative-going pulses, one in each of the 20 operative digit intervals of each beat. The pulse generator SPG is of similar form to the generators DSPG and DTPG except that its pulse time duration is of the order of 1 microsecond only, and the triggering input is arranged to be slightly delayed in its operation relative to the commencement of the related Dash and Dot pulses. The output from the generator SPG is fed through an "and" type gate G4 to an amplifier, whose output is available throughout the machine on busbar 134, to provide the Strobe waveform of Fig. 8g comprising a series of narrow pulses which are positive-going from a negative resting level occurring one in each operative digit interval of each beat at times slightly later than the commencement times of the Dash and Dot pulses.

As already explained, the successive operative digit intervals in each beat define the different binary digit values of the various dynamic form number-representing signals which take the form of pulse trains wherein a negative-going pulse, similar to the Dash pulse in any operative digit interval represents the binary value "1" and the absence of a pulse in any digit interval represents the binary value "0." A typical number-representing signal is shown in Fig. 8h indicative of decimal value 15. The instruction signals are similar, although the various digits have a controlling function and not a solely number-representing function. For the purpose of selectively examining any one of these operative digit intervals, there is provided a series of waveforms on separate leads each comprising a negative-going pulse resembling a Dash pulse, in a different one of the 20 operative digit intervals p0, p1—p19 of each beat. This series of pulse waveforms, known as the p-Pulse waveforms are provided by a series of circuits P0—P19 constituting the p-pulse generator circuit PPG. Each of these circuits essentially comprises a trigger circuit and an "and" type gate controlled thereby. The trigger circuits themselves are connected in the manner of a counter-chain, whereby the first circuit P0 is triggered by the trailing edge of each Blackout pulse to put it into a condition which allows the passage of the immediately following Dash pulse in digit interval p0 which is supplied thereto over the lead 135 through the associated gate device. The output from this circuit consists of a Dash pulse in the first or p0 digit-interval of each bar as shown in Fig. 8i. The second trigger gate circuit P1 is interconnected with the first circuit P0, whereby it is triggered to a condition which opens its associated gate by the trailing edge of the output Dash pulse from the circuit P0 so that it allows the passage of the Dash pulse in the second operative digit interval p1 of each beat to pass through its associated gate to form the p1-Pulse waveform of Fig. 8j. The circuit P1 is also back-connected to the circuit P0 whereby, as it is set into its gate opening condition, it provides a resetting input pulse for the previous trigger circuit P0, so as to close the gate associated with the latter, and thereby to inhibit the passage of the second and subsequent Dash pulses of the beat therethrough. The remaining trigger gate circuits P2—P19 are similarly arranged, whereby the various p2—p19-Pulse waveforms are provided therefrom. The last circuit P19 is arranged to be reset to its gate-closed condition by the leading edge of the next following Blackout pulse.

As explained in the aforementioned paper, storage of a number or instruction signal on the cathode ray tube screens is effected by moving the tube beam along a line which may be one of a plurality of separate storage lines arranged in a television type raster, each line holding, in the present case, 20 separate digit-representing signals of the signal train for one beat interval. The production of the necessary line scanning motion of the tube beam is effected in conventional manner by means of a saw-tooth waveform known as the XTB waveform shown in Fig. 9b and provided by a conventional triggered type sweep generator XWG which is controlled by the Blackout waveform (Fig. 9a) so as to commence its linear run-down in synchronism with the trailing edge of each Blackout pulse and to commence its fly-back portion in synchronism with the leading edge of each Blackout pulse. In practice push-pull waveforms are provided from this circuit and applied respectively to the two X deflection plates of the various cathode ray tubes throughout the machine, but for simplicity only a single busbar 131 is shown on the drawings. The above described waveforms are those which are invariable within the machine and govern its rhythmic beat operation. There are, however, a number of further waveforms which are of variable form in accordance with the changing requirements of the number of beats in each operative bar as already outlined.

A major controlling waveform of such variable form is that of the Halver waveform which is generated in a two-stable-state trigger circuit HWG to provide paraphase outputs known respectively as the HA and HB waveforms. This Halver waveform generator is again of conventional, e. g. Eccles-Jordan, type but is provided with a common triggering input to both of its cross-connected valves whereby it reverses its state with each input trigger pulse. The input triggering pulses for this halver waveform generator are constituted by the differentiated leading edges of the Blackout waveform Fig. 9a. For the normal four-beat-to-the-bar operation each Blackout pulse is applied to the circuit so that the respective HA and HB waveforms for 4 beat to the bar operation are as shown in Figs. 9c and 9d. As will be explained later, however, it is necessary to modify the operation of this halver waveform generator and the form of its output waves during 5 or 7 beat to the bar operation, and this is effected by suppressing certain Blackout trigger pulses by means of the modification circuit MDC. The manner in which this is effected will be described in detail later. The halver waveforms serve to define the scan/action operations of the storage devices exactly in the manner described in the aforesaid paper.

From the output from the halver waveform generator are derived a number of further controlling waveforms known as the Counter 0 (C0), Counter 1 (C1), Counter 2 (C2), Counter 3 (C3) and Counter 4 (C4) waveforms whose purpose is equivalent to that of the similar waveforms mentioned in the aforesaid paper. The C6 waveform, shown in Fig. 9e for 4 beat to bar operation, is generated in a circuit C0 which is again constituted by a two-stable-state trigger circuit having a common triggering input, whereby it reverses its state with each input pulse. The triggering input pulses to this circuit are constituted by the differentiated negative-going edges of the Hs waveform whereby the repetition frequency of the pulses of the counter 0 waveform is one half that of the Hs waveform. The subsequent counter waveform generators C1–C4 are likewise each constituted by a two-stable-state trigger circuit whose triggering input is derived from the output of the immediately preceding circuit whereby the C1 waveform has a periodicity one half that of the C0 waveform, the C2 waveform a periodicity one half that of the C1 waveform and so on. By virtue of their fundamental derivation from the halver waveform Hs, the form of each of the counter waveforms C0–C4 is modified when ever the halver waveform is modified as will be described later.

The main storage device MS consists of one or possibly more cathode ray tube storage devices of the kind described in the aforesaid paper by Williams and Kilburn. The arrangement of a single tube as such a store is shown in Fig. 10. This arrangement comprises a cathode ray tube 10 having the usual cathode 9, control grid or beam modulating electrode 8, X deflection plates 7 and Y deflection plates 6. In addition the tube is provided with a signal pick-up plate 11 arranged close to the screen of the tube and upon which are impressed signal potentials of characteristic form according to the storage charge pattern laid down on the tube screen by bombardment thereof by the tube beam in the manner described in the aforesaid paper. The tube beam is arranged to perform a linear X-scanning motion one during each beat period by application of the XTB waveform to the X deflection plates 7 over busbar 131.

In addition, a Y or vertical potential is applied by way of lead 120 to the Y deflection plates 6 to cause the X-scanning motion to take place at any one of 32 predetermined levels in a manner which will be described in greater detail later. When X-scanning motion of the tube beam takes place over a charge pattern already existing on the tube screen, signals derived from the pick-up plate 11 show a characteristic form which, with the "dot-dash" storage method described in the aforesaid paper and used in the present embodiment, are each characterised by an initial transient which is negative-going when the charge pattern is of Dot form used for signalling the binary value "0" and which is positive-going when the charge pattern is of Dash form used for signalling the binary value "1." These output signals are applied by lead 170 to the input terminals of the amplifier 12 which is conveniently of the form described in detail with reference to Figure 31 of the aforesaid paper. The output from this amplifier, in a form similar to the input but of magnified amplitude is applied by lead 171 to the read unit 13 of the storage device.

The read unit 13 comprises a thermionic valve V10 having its control grid connected to the lead 171 from the amplifier 12 and having its anode output signal supplied by way of diode D10 to the control grid of a second valve V11 which is arranged as a cathode follower with an output lead 172 from its cathode. The control grid of valve V10 is also supplied by way of diode D11 with the Strobe waveform of Fig. 8g from busbar 134, while its suppressor grid is connected by way of lead 173 to a potential which is normally at or about that of the earthed cathode of the valve but which can be lowered to cut off the valve at its suppressor grid for erasing purposes as described in the aforesaid paper. The cathode of the valve V10 is earthed while its anode is clamped at a maximum potential of +50 v. by means of diode D12. The diode D10 through which the signal output from the valve V10 is applied to valve V11, has its cathode connected to the anode of diode D13 whose cathode is connected directly to earth, whereby the potential of the control grid of valve V11 cannot rise above earth. A condenser C10 is connected between the control grid of valve V11 and earth, while such control grid is also supplied by way of diode D14 with the Dash waveform, Fig. 8e, from busbar 132.

Valve V10 is normally held cut off as the output from the amplifier is biased to a value of −15 v., while the resting level of the Strobe waveform is of −10 v. Unless both inputs rise sufficiently at the same time, to turn on the valve at its control grid the valve will remain cut off and therefore during any negative ("0" representing) output from the amplifier 12, the valve V10 will remain inoperative. During the period of a positive ("1" representing) output pulse from the amplifier 12 the control grid of valve V10 will be raised during the coincident portion of the Strobe pulse whereby the valve V10 is turned on for the period of such Strobe pulse. As a result a negative-going pulse from a resting level of +50 v. is generated at the anode of valve V10 and this is applied through diode D10 to the control grid of valve V11, where it lowers the control grid potential relative to the cathode, and at the same time charges condenser C10. During this time the Dash waveform on busbar 132 has lowered the anode potential of diode D14 to, say, −20 v. from its normal earth resting level, so that the condenser C1 remains charged negatively and the negative-going output at the cathode of valve V11 persists until the end of the Dash pulse, when consequent upon the raising of the anode of diode D14 to earth potential, the condenser C10 is discharged and the control grid potential of valve V11 is again raised, thereby terminating the negative output pulse at the cathode of valve V11. It will thus be seen that a negative-going Dash pulse, signalling binary value "1," is provided at the correct time within the digit period for each positive transient arriving from the amplifier 12, whereas no output pulse at all is provided if the transient from the amplifier is negative-going representing binary value 0. The output on lead 172 from the cathode of valve V11 in the read unit constitutes the read output of the storage device.

This read output is used to control regeneration of the charge pattern on the tube screen by application to the input of the write unit 14. This write unit comprises a valve V12 having its control grid supplied with input signals of standard machine form, i. e. a negative-going pulse for binary value "1" and no pulse for binary value "0" as shown in Fig. 8h, while its anode is D. C. connected to the control grid of valve V13 arranged as a cathode follower output valve and having its cathode output lead 174 connected to the beam modulating electrode 8 of the cathode ray tube 10. The control grid of valve V12 is supplied with the Dot waveform Fig. 8f by way of diode D15 from busbar 133, while in addition such control grid is also connected by way of diode D16 to a write input lead 161 upon which standard type machine signals, Fig. 8h, can be applied. The anode of valve V12 is clamped at a maximum value of +50 v. by means of diode D17 while a further so-called Blackout valve V14 having its cathode connected to earth and its anode directly connected to the anode of valve V12, has its suppressor grid supplied with the HA waveform from busbar 175. If, as is usually the case, the store comprises several storage tubes, the control grid of this valve is connected to one end of a plurality of resistors R whose opposite ends are individually connected to sources of control potential derived, in the manner described later, from the address staticisor unit LST whereby only a selected one of the respective blackout valves V14 of the different store devices is cut-off during certain Action beats to render that tube alone operative.

In the operation of this write unit, in the absence of any input signal to the grid of valve V12 either on the read output lead 172 from the cathode of valve V11 or on the write input lead 161, the valve V12 is normally conducting and its anode potential is therefore low with the result that the control grid of valve V13 is low and the cathode output point on the latter is likewise low, to provide a potential on the beam modulating electrode 8 of the storage tube 10 sufficiently negative to cut-off the tube beam. During the time of each negative pulse of the Dot waveform, Fig. 8f, which is applied through diode D15, valve V12 will be cut off and the positive-going output pulse at the anode of valve V12 will provide a similar positive-going output at the cathode of valve V13 to turn the beam of the storage tube on for the Dot pulse period and thereby to cause a Dot type storage charge pattern on the tube screen. If, however, either the output from the read unit 13 on lead 172 or the write input on lead 161 consists of a negative-going Dash pulse, Fig. 8e, representing binary value "1," the grid of valve V12 in addition to being driven negative by the Dot waveform, is also driven negative and held negative for the longer Dash pulse period and in consequence the output from valve V13 comprises a positive pulse of similar duration with resultant turning on of the tube beam to record a Dash or binary "1" value charge pattern.

The blackout valve V14 is employed to render the storage tube inoperative during action beat periods unless it is particularly selected for use during those periods while allowing it to be operative during intervening scan beat periods when normal systematic regeneration of each of the storage lines is arranged to take place in the manner described in the aforesaid paper in all the storage tubes. This is effected by applying the $H_A$ waveform on lead 175 to the suppressor grid of the valve which is normally conductive with its grid connected to a suitable approximately earth potential by way of the resistors R and associated leads 176. In consequence of the normal anode current flow in valve V14, the anode potential of the valve, and in consequence of the potential at the anode of valve V12 and the grid potential of valve V13, are lowered also to inhibit any positive output to the modulating electrode 8 of the tube 10 sufficient to turn on the tube beam. When, however, valve V14 is cut off by the $H_A$ waveform during each scan beat the anode potential of the valve and in consequence the control grid potential of valve V13, is free to rise if it is required to do so by valve V12.

The resistors R are used to control the selection of any particular tube out of a number of exactly similar storage tubes when these are used to provide a large capacity storage device. The operation is as follows:

Each of the resistors R is connected to a different one of the output terminals of certain sections of the address selecting staticisor LST assigned to tube selection. These terminals, as explained later, may either be positive relative to earth, or negative to earth, according to the setting of the staticisor section. If any one of the resistors R is at any time connected to a positive potential source then the valve V14 will remain turned on at its control grid at that time regardless of the fact that the remaining resistor or resistors may be connected to a negative potential source. Only when every resistor R is connected to a negative source will the valve V14 be turned off at its control grid. This occurs only when the resistors are connected to the particular selection of output terminals of the different staticisor units which are all caused to go negative at the same time by reason of the application of a particular and unique configuration of instruction digits thereto. In consequence one storage tube only out of the plurality which may be provided can be arranged to be operative during any given action beat, whereas all of the tubes in the store operate simultaneously to regenerate the contents of their different storage lines during the successive scan beats.

The moving of the tube beam in the Y direction is effected by the Y-shift waveform which resembles that shown in Figure 25(h) of the aforesaid paper, whereby successive storage lines are scanned during successive scan beats to effect systematic regeneration and any line is made available during the intervening action beats. The Y-shift generator YSG which provides this Y-shift waveform over lead 120 is conveniently of the form described with relation to Figures 35, 36 and 37 of the aforesaid paper with the exception that the various manual control switches S0, S1–S4 of that paper are dispensed with and the control of the flip-flops 0, 1–4, which govern the anode followers feeding the control grids of the valves $T^10$–$T^14$, is transferred to the output terminals of certain sections of the L staticisor LST, normally the first 5 sections which staticise the digits $p0$–$p4$ of an instruction signal and which govern the line selection in the store. When an appropriate potential is supplied from such staticisor output terminals the related ones of the valves $T^10$–$T^14$ are cut off during action beats to cause the appropriate value of current flow to the Y-shift valve in a manner exactly analogous to that described in the paper with reference to direct manual control. As the setting of the L staticisor normally varies at each action beat, the scanning level during successive action beats will be variable and not at a common level as shown in Figure 25(h) of the paper.

The accumulator unit A comprises a single storage tube 16 arranged in substantially identical manner to that described in connection with Fig. 10 with its pick-up plate 17 feeding signals to amplifier 18 and thence to a read unit 19. A write unit 20 controls the beam modulating electrode of the tube. The tube normally operates continuously over its four storage lines in turn so that the control by the $H_A$ waveform on valve V14, Fig. 10, is not needed. The direct connection by way of lead 172, Fig. 10, between the cathode of valve V11 and the control grid of valve V12, is also interrupted to allow the insertion of an arithmetical unit 21. The modified form of these elements is shown in Fig. 13 where it will be seen that the cathode of valve V11 of the read unit of the storage device is connected to one input terminal 177 of an arithmetical unit 21 the output terminal 179 of which is connected to the control grid of valve V3. The separate write input to valve V12 of Fig. 10 through diode D16 is dispensed with, and this write input lead 161[1] is now connected to the second input terminal 178 of the arithmetical unit. The latter unit may be of any desired form, usually an adder circuit as well known in the art whereby two number-representing pulse signal trains synchronised in timing with relation to one another, may be so combined as to produce an output pulse train which represents the sum number of the two input numbers. It is this answer number output which therefore controls the subsequent modulation of the beam in the tube 16 and the consequential re-writing of the charge pattern on the tube screen. The output from the arithmetical unit is also made available for external use by way of lead 162. The output on this lead can represent the content of the accumulator tube itself if, at the time of reading, the accumulator content, no input signals are applied on the second input lead 161[1] to the arithmetical unit 21.

The storage tube of the accumulator is arranged to have its beam execute a linear scanning motion in synchronism with the main store MS by applying the XTB waveform to its X deflection plates from busbar 131. At the most, this accumulator tube is required to store only a total of 80 digits, i. e. on four 20 digit X lines, and in consequence the Y-shift potentials therefor can be provided by a simplified and curtailed version of the Y-shift generator as used in the main storage device. As this Y-shift generator, shown at AYS, need provide only for the simple and repetitive scanning of the four separate storage lines in turn commencing with the first line or line 0 during the time of beat A2, which is when the first 20 digit section of any number will be applied to the accumulator, the Y-shift arrangements AYS can be of the simple form shown in Figs. 23 and 24 of the paper, but restricted to four steps only. There is no requirement for proceeding to any variable and selectable level at particular times so that the generator circuit need comprise only two valves T0 and T1 of the arrangement shown in Figure 23, together with the related Y-shift valve and two counter circuits for controlling the control grids of those valves T0 and T1 controlled primarily by the Blackout waveform.

The control unit CL comprises another single cathode ray storage tube arranged with its signal pick-up plate 26 feeding amplifier 27 and read unit 28 and having an adder unit 30 interposed between such read unit and the write unit 29 substantially similar to that of the accumulator A as just described. The only major difference is that as only two storage lines are needed, one of the C1 or Control Instruction number and the other for the P1 or Present Instruction number, a simple two-step Y-deflection waveform only is necessary and this is provided by the CL–Y waveform generator GYWG as will be described in detail later. As with the accumulator there is no need ever to suppress operation of the tube beam during certain beats and in consequence the Blackout valve V14 of Fig. 10 and its associated circuit elements are omitted.

The main store staticisor MSTR comprises a total of 20 similar sections divided between the address selecting or L staticisor unit LST and the function or F staticisor unit FST. Each section of each staticisor unit comprises a two-stable-state trigger circuit, e. g. of the Eccles-Jordan type and the first two sections of the L staticisor unit LST are shown in Figure 3. As will be seen from this figure each section comprises a pair of thermionic valves $V1_0$, $V2_0$ cross-connected between anode and suppressor grids to provide the known form of two-stable-state trigger circuit. Referring particularly to the first section, the control grid of the first valve $V1_0$ is connected to the cathodes of two diodes $D1_0$, $D2_0$ and also by way of a load resistor $R1_0$ to a source of negative potential. The anode of the diode $D1_0$ is connected to the signal input lead 165 which is common to all of the staticisor sections, whereas the diode $D2_0$ is supplied with the P0 pulse waveform. The control grid of the opposite valve $V2_0$ is connected to a positive potential source through resistor $R1_1$ and also by way of differentiating condenser $C1_2$ to the busbar 175 carrying the $H_A$ waveform.

In the operatin of such a staticisor section the trigger circuit is normally in the condition with valve $V1_0$ conducting and valve $V2_0$ cut off at its suppressor grid due to the preceding negative-going edge of the differentiated $H_A$ waveform. If, during the time of any p0 pulse when the anode of diode $D2_0$ is driven negative, there is a coincident negative pulse on the instruction number applied on lead 165, the common cathode point of the diodes $D1_0$, $D2_0$ which form an "and" type gate, is driven negative and valve $V1_0$ is cut off. Unless these two pulses coincide, however, valve $V1_0$ will be uneffected and any other pulse than that present in digit interval p0 within the instruction signal on lead 165 will not effect the trigger circuit. When valve $V1_0$ is cut off the potentials at the suppressor grids and anodes of the two valves will be reversed. Thus, whereas the anode potential of valve $V1_0$ and the suppressor grid potential of valve $V2_0$ are normally low and the anode potential of valve $V2_0$ and the suppressor grid potential of valve $V1_0$ are normally high, whenever the circuit is triggered as just explained, the potentials at the anode of valve $V1_0$ and suppressor grid of valve $V2_0$ become high and those of the anode of valve $V2_0$ and the suppressor grid of valve $V1_0$ become low. These output potentials are made available externally as control potentials by way of cathode follower valve stages $V3_0$, $V4_0$ and $V5_0$, $V6_0$.

The second trigger circuit of valves $V1_1$ and $V2_1$ is substantially identical with the exception that diode $D2_1$ is supplied with the p1 pulse waveform instead of the p0 pulse waveform as in the first section, so that this section is sensitive alone to the pulse content of the second or p1 digit position in any input signal. The remaining stages of both units LST and FST are likewise supplied with the different p-pulses so that they are sensitive respectively to the remaining digit positions of the input signal.

As a result of such an arrangement any dynamic pulse signal supplied on lead 165 is converted into a series of static output potentials controlled respectively by the pulse signal content of the different digit positions of the input signal. Thus, with the first five sections of the staticisor unit LST which are used for controlling the Y-shift generator YSG to select the required one of the 32 separate storage lines in the storage tube, the selection, for example, of line 21 is effected by giving the input pulse train the number significance of 10101 whereby the first, third and fifth sections of the staticisor will be triggered. By suitably connecting the cathode follower stage output of valve V3 of each of these sections to the related flip-flops of the circuit of Figure 35 of the aforesaid paper, the first, third and fifth flip-flops will be triggered to turn off the associated valves $T^1 0$, $T^1 2$ and $T^1 4$ whereas the remaining two valves $T^1 1$ and $T^1 3$ will remain turned on so that, in a manner exactly as explained in the aforesaid paper, line scanning during the next following action beat will be on line 21.

In addition and in accordance with the present invention the staticisor sections of the first five or line address selecting stages of the L statisisor LST are provided with an additional common triggering input. Thus referring to Figure 3 and valves $V1_0$ and $V2_0$ input lead 105 to terminal 102 is connected to the cathodes of two diodes D100 and D101 whose anodes are respectively connected to the anodes of valves $V1_0$ and $V2_0$. The common cathode point of diodes D100 and D101 is connected to a source of positive potential +250 v. by way of resistor 103. In precisely similar manner the valves $V1_1$ and $V2_1$ of the second staticisor section are connected to a common input terminal 102 by way of diodes $D100_1$ and $D101_1$ which is fed through condenser 104 from the output from the cathode follower stage $V3_0$ of the first or p0 selecting section. These first five trigger circuits are thus effectively arranged as a binary counting chain whereby upon the supply of a triggering pulse upon the lead 105 to the first section, that section will be caused to reverse its condition whatever it was previously. Thus if it was previously in the untriggered state indicating that the first digit of the line selecting pulse train was previously "0," then it will reverse to the "1" representing condition and vice versa. The additional connection from this section to the next will result in the second section being triggered to reverse its state whenever the first section reverts from its triggered or "1" condition to its untriggered or "0" condition. Thus, assuming that the first five staticisor sections have been set up to indicate line 21 by triggering of stages 1, 3 and 5 and by non-triggering of stages 2 and 4, then the supply of a further pulse on lead 105 will reverse the first stage from triggered to untriggered state representing "0," whereas the second stage will now be reversed from its untriggered to its triggered state to represent "1" thereby altering the operation conditions of the Y-shift generator YSG to cause the latter to scan line 22 instead of 21.

The pre-pulse unit PPU shown in detail in Fig. 12 serves to generate a sharp pulse signal which marks the commencement of each operative bar and comprises two pentode valves V20 and V21 cross-connected between their anodes and suppressor grids to constitute a conventional two-stable-state trigger circuit having separate triggering inputs to their respective control grids. The triggering input to the control grid of valve V20 is derived from the anode output of valve V22 whose control grid is normally held at a potential, relative to its cathode, sufficient to allow space current flow. This control potential is derived over lead 180 from a source, not shown, but which may include a manual switch for preventing the repetitive generation of prepulses when the machine is required not to operate with an automatic sequence but to operate bar by bar each separately initiated by a manually generated pulse which serves as an alternative pre-pulse. As such facility forms no part of the present invention it will not be described or illustrated. The valve V22 is normally held cut off at its suppressor grid but can be made momentarily conductive by the differentiated positive edge of the C0 waveform, Fig. 9e, supplied over busbar 181. When valve V22 is thus rendered momentarily conductive a negative-going pulse is delivered to the control grid of valve V20 to cut off the normal on condition of such valve and thus reverse the state of the trigger circuit to one in which valve V21 is conducting. This condition persists until the subsequent negative-going edge of the same C0 waveform which, after differentiation, is applied to the control grid of valve V21 whereupon a reverse action occurs in the usual way.

The suppressor grid of valve V20, which is normally at or about earth potential due to the cut off state of the opposite valve V21, is connected to one diode D20 of a pair of diodes D20 and D21 which together constitute an "and" type gate. The opposite diode D21 of the pair has its anode connected to a source of positive potential +300 v. via a potentiometer network of resistors R20 and R21 the junction point of which is connected via capacitor C20 to busbar 175 carrying the H$_A$ waveform, Fig. 9c. The common cathodes of diodes D20 and D21 are connected by way of load resistor R22 to a source of negative potential −150 v. and also to the control grid of a cathode follower valve V23 whose cathode constitutes the output supply connection for the pre-pulse waveform over busbar 182.

In the operation of this device, due to the trigger circuit of valves V20 and V21 being in its normal or reset condition with valve V20 conducting and valve V21 cut off, the anode of diode D20 is held at or about earth potential and the differentiated negative-going edges of the H$_A$ waveform are ineffective to pass through diode D21 to the control grid of the valve V23 due to the coincidence gate operation of the double diode circuit. Positive-going differentiated pulses of the H$_A$ waveform are passed directly to earth via further diode D22. The output valve V23 is normally in a state where it is conducting and the cathode point is at or about earth potential. Upon the arrival of a positive-going edge of the C0 waveform at the end of beat S2, the trigger circuit of valves V20 and V21 will be reversed whereby valve V21 is conducting and valve V20 is cut off whereupon the anode of diode D20 is driven negative relative to earth so that the next following negative-going edge of the H$_A$ waveform occurring at the end of beat A2 (with 4 beat operation) provides a sharp differentiated pulse which passes through diode D21 and is operative on the cathode follower valve V23 to provide a similar sharp pulse output on busbar 182. The circuit is reset by the subsequent negative edge of the C0 waveform at the end of beat S1 and no further H$_A$ pulses can pass therethrough until the trigger circuit is again triggered. The resultant pre-pulse waveform is varied according to the number of operative beats in the bar due to the controlling variation of the H$_A$ waveform.

The generator unit GYWG which provides the necessary waveforms for controlling the instruction gate IG and for shifting the beam of the storage tube in the control unit CL between one and the other of its two alternative scanning levels is shown schematically in Fig. 11.

The unit comprises two trigger circuits 35 and 36 each of the two-stable-state type and each provided with separate triggering and resetting inputs. The trigger circuit 35 is supplied at its triggering input terminal with the Prepulse waveform whereby the circuit is set into its triggered condition at the commencement of the first beat S1 of each bar. The resetting input terminal of trigger circuit 35 is supplied with the differentiated Hs waveform, Fig. 9d, so that, after triggering, it becomes reset at the end of beat S1. The trigger circuit 35 provides two output waveforms one of which, known as the S1 waveform, is shown in Fig. 9f and comprises a positive-going square pulse during the beat period S1 of each bar. The other output is the usual paraphase version.

The second trigger circuit 36 has its triggering input terminal supplied with the differentiated S1 waveform whereby it is triggered by the negative edge thereof at the beginning of the second beat A1 of each bar. The resetting input terminal of this second trigger circuit 36 is also supplied with the differentiated Hs waveform. The differentiation circuit used for supplying this second trigger circuit is made slower than that of the first trigger circuit 35 whereby resetting of the trigger circuit 36 occurs at the end of the third beat S2. The resultant output waveforms from the trigger circuit 36 constitute the CL–Y plate waveforms for the control unit storage tube and one of these is shown in Fig. 9g from which it can be seen that one (the PI line) of the two storage lines will be scanned during beats A1 and S2 of each bar and the other storage line (the CI line) scanned during the remaining beats.

An "and" type gate G37 having two controlling inputs has one controlling input supplied with the H$_A$ waveform from busbar 175 and the other controlling input supplied with the paraphased version of the S1 waveform and the similar paraphased version of the CL–Y plate waveform combined in a buffer circuit. The output from this gate G37, which is operative only when both controlling inputs are driven negative, is shown in Fig. 9h and constitutes the instruction gate waveform for controlling the gate IG in the output lead 181 from the control unit CL to the staticisor MSTR. As will be seen from Fig. 9h such instruction gate waveform is negative-going during beats S1 and S2 and positive at all other times, so that the gate IG is opened only during scan beats.

The action waveform generator AWG provides means for controlling the various storage tubes whereby the cathode ray tubes of the latter are rendered operative or inoperative according to different requirements and also for controlling certain of the route selecting gate circuits in the machine. As shown in Fig. 11 the generator comprises a two-stable-state trigger circuit 40 having separate triggering and resetting inputs. The triggering input is derived over conductor 138 from the generator GYWG whereby it is provided with triggering pulses coincident with the commencement of beat A1 and beat A2. The resetting input of this trigger circuit is supplied with the differentiated H$_A$ waveform from busbar 175 whereby it is reset at the commencement of beats S1 and S2. In view of its dependence upon the H$_A$ waveform the resultant output waveform is dependent upon the number of action beats in the bar. When the machine is operating with a four-beat-to-the-bar rhythm the waveform is as shown in Fig. 9i whereas when it is operating with a five beat to the bar rhythm the waveform is as shown in Fig. 9j. The inverse or paraphase version of this Action waveform is not illustrated but its form will be obvious.

The purpose of the test unit TU is normally to allow the passage of a $p0$ pulse over lead 164 to the adding circuit 30 of the control unit CL at the beginning of each S1 beat so as, effectively, to add $2^0$ or unity to the number already stored in the CI line of the control unit store tube and also, when required to do so in obedience to a particular form of instruction, to examine the most significant digit position of a number signal applied thereto to determine whether such signal is representative of binary value "0" or binary value "1" and thereafter to alter the p-pulse which is supplied to the control unit from a p0 pulse to a p1 pulse if the examined digit is a "1." As this test function is not concerned with the present invention the description of the test unit will be restricted to those elements which supply the normal p0 pulse at the beginning of each S1 beat.

The test unit, as shown in Fig. 11, comprises a two-stable-state trigger circuit 50 having separate triggering and resetting inputs. The triggering input is supplied through an "and" type gate G51 whose input is connected by way of lead 141 to the read output lead 162 of the accumulator A. This gate is opened only during the above-mentioned testing operation and the trigger circuit 50 therefore normally rests in its reset state due to the continuous supply of differentiated pulses from the combined output of the trigger circuit 36 in the CL–Y plate generator GYWG. When in this reset condition, the trigger circuit 50 supplies a continuous gate opening potential to the further "and" type gate G52 which is also controlled by the paraphase version of the S1 waveform, Fig. 9f, so that the gate is opened only during S1 beats. This gate controls the supply of the p0-pulse waveform to the control unit CL over lead 164 whereby such p0-pulse is released to the adding circuit 30 at the beginning of each S1 beat.

The operation of the machine under four beat to the bar conditions is exactly as in the existing machine already referred to.

The commencement of each operative bar is marked by the release of a Prepulse signal from the unit PPU. During the first beat S1, the H$_A$ waveform renders all the tubes in the main store MS operative and causes the Y-scan generator YSG to be operative, as described in the aforesaid paper, to produce scanning at the next sequential level of the stepped Y-shift waveform as determined by the various Counter waveforms C0–C4. The gate OTG is closed by the paraphase version of the Action waveform while gate ITG is normally always closed. The various main store tubes therefore regenerate on the selected line. In the same beat, gate G52 of the Test unit TU is opened and the p0-pulse passes therethrough to the adding circuit 30 of the Control unit CL which is also regenerating on the CI storage line due to the CL–Y waveform, Fig. 9g. As the existing CI number is read out from read unit 28 to add unit 30 it is combined with such p0-pulse to increase the CI number by unity. This CI number, comprises digit signals expressing the address in the main store MS where the next required Present Instruction is located, say line 11, and affects only the L-staticisor unit LST, all the function digits being "0." As the new CI number issues from the add unit 30 during this beat S1 it passes back into the tube 25 for retention until the next bar and also passes by lead 181 to the Instruction gate IG which is opened by the IG waveform, Fig. 9h and thence over lead 165 to the staticisor MSTR where it sets up the various sections of the unit LST in accordance with the address of the required present instruction such staticisor is not yet effective however as control of scanning in the main store still resides in the Counter waveforms. In the same beat the accumulator A is regenerating line 1 of its four storage lines under the control of its own simple stepped Y-shift waveform.

Upon the commencement of the second beat A1 of the bar, transfer of control of the Y-shift generator YSG to the staticisor unit LTS takes place whereupon the single selected tube of the main store begins to scan the line 11 determined by the CI number. The content of this storage line is read out from the main store on lead 160 and passes over lead 140 to the gate G105. The outward transfer gate OTG is closed at this time as it is controlled by the function staticisor unit FST.

Gate G105 is open however as both the H$_S$ and the CL–Y waveforms are negative so that the present instruction number passes therethrough to the adder 30 of the control unit CL and becomes stored on the other or PI line which is now operative owing to the change in the CL–Y waveform, Fig. 9g. During this beat the instruction gate IG is closed by the IG waveform, Fig. 9h. The accumulator A regenerates during this beat on its next sequential line, line 2.

In the next beat S2, control of scanning in the main store MS again passes to the counter waveforms and the next sequential line is regenerated in all tubes of such store. The gate OTG remains closed as does gate ITG while gate G105 is also now closed as the H$_S$ waveform is positive-going. The accumulator A regenerates on its further line, line 3. Meanwhile in the control unit CL, the new present instruction received during the previous beat is regenerated and, since there is no external input to the add unit 30, emerges unaltered and passes by way of lead 181 to the instruction gate IG which is now opened again by the IG waveform, and thence to the staticisor MSTR where both the address unit LST and the function unit FST are set up according to the digits of such instruction number. These digits define the address in the main store MS where the required computation number is located and also the type of operation which is to be performed with such number. For example, the instruction may call for the number to be fed to the accumulator and combined with, e. g. added to, the number, if any, already in the latter.

In the fourth beat A2 of the bar, the staticisor MSTR takes over control once again to cause scanning of the main store at the address location called for while the function unit FST delivers the requisite combination of gate opening potentials to set up the desired signal transfer route. Thus, with the example quoted above, the gate OTG will be opened so that the read out signal from the main store MS passes over leads 160 and 163 to the arithmetical unit 21 where it is combined with the contents of the next sequential line, line 0, of the accumulator tube which is being regenerated at that time. This marks the end of the 4 beat bar and after the next Prepulse signal which follows at the end of the beat, the cycle of operations is repeated to select and utilise the next instruction and so on.

The various modifications in the operation of such a four beat machine in accordance with the present invention will now be considered in detail.

In order that the two parts of a 40-digit number word may be extracted from or written into the main store MS during the two adjacent beats (A2 and A3) without the necessity for setting-up the address of the second 20-digit part upon the L-staticisor unit LST of the main store staticisor MSTR by means of a new and entirely separate instruction word, it is arranged during loading-in of the data to the main store that all 40-digit words are held within the store in such a fashion that the addresses of the two parts of every word bear a constant and predetermined relationship to one another. In the simplest and preferred case this is effected by locating the two parts of a 40-digit word upon adjacent addresses in the store, i. e. the numbers denoting the addresses differ by one; if the first 20-digit part of the number is in address $l$ then the second 20-digit part is in $l+1$ (or less conveniently $l-1$). While such simple $l$ and $l+1$ relationship is preferred it will be obvious that other and less simple relationships may be employed.

With such constant and predetermined relationship between the two halves of the 40-digit word it is necessary only to arrange that the address selecting L-staticisor unit LST is appropriately altered at the end of beat A2 whenever the instruction word is one which denotes that a 40-digit number is being used. Such alteration of the L-staticisor unit LST is effected by means of a circuit MDC which will be described in greater detail later and which is controlled by the presence or absence of a "1" digit at a chosen digit position of the function or F-staticisor FST. In the embodiment shown in Figs. 2a, 2b, the 20th digit, i. e. that coincident in timing with the p19-Pulse is utilised. This circuit MDC, when supplied with an appropriate potential on lead 101, prepares for the supply of a suitable signal by way of lead 105 to the address or L-staticisor LST at the end of beat A2 to effect the necessary conversion of setting of the latter.

The necessary change of setting of the various trigger circuits forming the L-staticisor unit LST, may be achieved by feeding a suitable selection of the p-Pulse waveform series to the related sections so as to trigger the various trigger circuits to the required new conditions.

When, as is preferable, the addresses of the two 20-digit parts of the 40-digit number have a constant and predetermined relationship such as $l$ and $l+x$ the requisite change of setting of the staticisor unit LST is more conveniently effected by interconnecting each of the trigger circuits with its next adjacent trigger circuit to form a counter circuit so that triggering of any circuit from its "1" to its "0" state causes triggering of the next following circuit. Such a manner of interconnection is that already described in connection with Fig. 3 where the valves $V1_0$, $V2_0$ and their associated circuit components constitute a trigger circuit for one staticisor section, such circuit being triggered from the normal condition in which V1 is conducting to its anode and V2 is cut-off at its suppressor, by the coincidence of a negative-going input signal pulse of an applied instruction word with the related and similarly negative-going p-Pulse at the respective input terminals of the multiple diode gate circuit of diodes D1, D2. The trigger circuit is reset to its normal or quiescent condition by the differentiated negative-going edge of the Halver-A waveform shown in diagram (e) of Fig. 1, applied to the control grid of valve V2.

As already explained, each trigger circuit is additionally provided with a further and common triggering input by way of terminal 102 to the circuit of diodes D100 and D101 and resistance 103 connected between the common junction of the cathodes of the diodes to the terminal 102 and a source of positive potential. In the case of the second and subsequent L-staticisor units this triggering input terminal 102 is connected through a differentiating circuit of condenser 104 and resistance 103 to the output terminal of the cathode follower stage V3 of the previous trigger circuit. The terminal 102 of the first L-staticisor section is connected by way of lead 105 and a control gate circuit in the circuit MDC to a suitable source of input triggering pulses.

In the operation of this modified form of staticisor under the condition where a 40-digit number is being transferred the various sections are initially setup from their quiescent state in the manner described by coincidence of the input signal pulses with the appropriate p-Pulses. Such set condition persists for the duration of beat A2 whereupon, during the intervening blackout period, one or more separate negative-going pulses equal in number to $x$ of the above quoted relationship are applied by way of lead 102 to the first trigger circuit. Such pulses reverse the state of the first circuit a similar number of times, i. e. $x$ times, and any change of state from the "1" condition to the "0" condition is fed as a negative-going trigger pulse to the next following circuit and so on in the usual binary counter circuit manner. The L-staticisor is accordingly advanced in its setting by the amount $x$ whatever its initial address setting $l$. Such reset condition of $l+x$ is accordingly available during the next following beat A3.

In the simplest and most preferred case $x$ is made unity so that the two 20-digit number parts are stored in consecutive addresses. In this case if it is arranged that the first (i. e. the least significant) 20-digit part of each 40-digit number is held in an address denoted by an even number and which is therefore signalled in the binary code by a "0" in the first or least significant digit section of the L-staticisor LST, the required change of the staticisor can be effected by feeding a single pulse to such first staticisor section to change its state. There is then no need to connect the remaining staticisor sections as a counter circuit.

In the normal operation of the four-beat machine as described above each of the staticisor sections of both address and function units LST and FST are reset, if necessary, at the ends of beats A1 and A2 by the negative-going edges of the Halver-A waveform. The switchings valves of the Y-Shift generator YSG, described in the aforesaid paper are similarly controlled by the Halver-A waveform, so that during the scan beats S1, S2, the Y-shift for the beam of the operative tube in the main store MS is controlled by the various Counter waveforms derived by counting down from the Halver waveform and thus performs the sequential line scanning movement required for regeneration purposes.

In order to provide for the additional, A3, beat of the five-beat bar of the present invention and to enable the stepping-on of the address staticisor unit LST to select the second 20-digit portion of a 40-digit number, the Halver waveform must be modified. This Halver waveform can no longer be considered as an unvariable basic waveform as in the earlier four beat machine but as a waveform which is derived, as operation demands, from the basic X time-base cycle. Most conveniently the basic timing waveform of the machine can be regarded as the cathode ray tube Blackout waveform which is derived from the generator BOPG and is associated with the X time-base XWG. This Blackout waveform is indicated in Fig. 1(d).

The modified arrangements of the present invention for providing the altered waveforms is illustrated schematically in Figure 4 where the Halver waveform generator HWG comprises a scale-of-two trigger circuit which is reversed in its setting by the differentiated pulses of the Blackout waveform fed thereto by way of a gate circuit G100 which is normally open to pass such Blackout pulses. In such normal operation with the gate circuit G100 open, each Blackout pulse will cause reversal of the trigger circuit of the generator HWG with a resultant output waveform precisely similar to that already described.

When five-beat operation is required to handle a 40-digit number word, it is necessary to inhibit the change of the Halver waveform which would normally take place at the end of beat A2 and to delay such change until the end of beat A3. This inhibition is effected through the intermediary of the circuit MDC and which, referring to Fig. 4, comprises a two-state trigger circuit 106 which is triggered from its quiescent state over input lead 101 from that section of the function staticisor unit FST which deals with the special digit used to signal a 40-digit number operation; in the present instance, the last digit or p19 section. When this last section of the function staticisor is triggered by the presence of a "1" digit in the twentieth digit position of an instruction word, the trigger circuit 106 is reversed and supplies a potential over lead 107 to open a normally-closed gate circuit G101. This gate circuit is in series with a connection between the p1-pulse section of the p-Pulse generator PPG and the triggering input of a further two-state trigger circuit 109. This latter trigger circuit provides an output potential on lead 110, which, when the circuit 109 is reversed from its normal quiescent condition, applies a potential to the gate circuit G100 to close the latter. The first trigger circuit 106 is reset to its normal quiescent condition by differentiated pulses of the p10-Pulse waveform, while the second trigger circuit 109 is likewise reset to its normal quiescent condition by differentiated pulses of the p0-Pulse waveform.

The operation of this arrangement is briefly as follows: Upon triggering of the last section of the function staticisor FST during beat S2, the trigger circuit 106 is reversed to supply a potential which opens gate circuit G101 to allow the p1-Pulse occurring immediately after the Blackout pulse at the beginning of beat A2 to cause triggering of the further trigger circuit 109. The first trigger circuit 106 is then reset to its normal condition by the subsequent p10-Pulse of the beat A2, so that the gate G101 is closed again and no further triggering of circuit 109 is possible. The latter circuit therefore remains triggered only until the occurrence of the next p0-Pulse which will be that of beat A3, so that the gate G100 remains closed during the period of from the p1-Pulse of beat A2 until the p0-Pulse of beat A3 and thus covers the time of occurrence of the Blackout pulse at the commencement of beat A3 so that such Blackout pulse is not fed to the Halver waveform generator HWG and the Halver waveform consequently persists at the level occurring during beat A2 throughout the following beat A3. After the instant of occurrence of the p0-Pulse of beat A3, the trigger circuit 109 is reset and the gate G100 is accordingly reopened to allow the next following Blackout pulse, i. e. that occurring at the end of beat A3 to be operative upon the Halver waveform generator HWG, so that the Halver waveform then resumes its normal form in commencement of the next following bar of operation.

The same trigger circuit 109 is used to control the stepping-on of the address staticisor unit LST by supplying a potential over lead 111 which opens a normally-closed gate circuit G103. This gate circuit is in the lead 102, between the Blackout waveform generator BOPG and the common triggering input of the first or lowest significant digit section of the L-staticisor unit LST whose operation has already been described. The trigger circuit 109 is operative to supply an opening potential to the gate G103 during the period which includes the Blackout pulse at the commencement of beat A3 and this Blackout pulse is supplied, in differentiated form, through the gate circuit G103 to provide a one-step trigerring input to the L-staticisor unit LST whereby the latter has its address selection number advanced by unity.

The absence of reversal of the modified Halver-A waveform at the end of beat A2 under 40-digit conditions preevnts the resetting of the L-staticisor unit LST, which would normally be effected at that instant, while the extension of the Halver-A waveform over beat A3 ensures that the control of the Y-shift generator YSG does not revert to the counter waveforms for regeneration purposes until the next beat, S1, of the following bar.

It will be apparent that the effect of the modified Halver waveform is to suspend or delay operations in the machine for the duration of the added beat A3. The various counter waveforms C0, C1, C2, C3 and C4 used in the machine are generated by counting down from the Halver waveform so that the one beat delay in the transition of the latter arising from the requirement of a five-beat bar is reflected as similar extensions of the counter waveforms. The CL Y-Plate waveform used to control address selection in the tube 25 of control unit CL and the operation of the instruction gate IG must necessarily also be modified to extend over the added beat. As this waveform is also generated from the basic Halver and Counter waveforms, the necessary extension is provided automatically. Diagram (f) of Fig. 1 illustrates the modified form of this CL Y-Plate waveform, from which it will be seen that the CI address line of the tube 25 will automatically be explored at all times, except during beats A1 and S2 when the PI address line is scanned instead. Similarly the prepulse generator unit PPU which provides the prepulse signals to initiate the next bar, is also controlled by the Halver waveform and is similarly and appropriately affected by any call for an additional fifth beat.

The four/five beat machine according to the present invention may be arranged in somewhat simpler fashion than the earlier machines already referred to so far as certain details are concerned. In such earlier machines, the function staticisor unit FST is reset to zero at the end of the first beat S1 of each bar and the various routing circuits throughout the machine are so arranged that when, as is the case with an instruction word, all the function digits are "Os" the transfer path which is made operative is that between the main store MS and the PI line of the store of the control unit CL so that during the following beat A1 the word which is read out from the main store MS (which forms the present instruction PI) is fed automatically to the PI line of the tube 25 of the control unit.

In the present four/five beat machine when it is desired to extend a 40-digit word to 80 digits during computation in association with the accumulator A it is necessary that the routing condition set up by the present instruction PI during beat S2 should persist right through until the end of the extension period, i. e. until the end of beat A1 of the following bar. In order to achieve this, the present machine is re-arranged in its connections so that the function staticisor unit FST is always left in its set condition until the end of the beat A1 of the bar which follows that in which it was set up. This is achieved as shown diagrammatically in Fig. 2(b) by applying the Halver-A waveform previously used for resetting both staticisor units LST and FST directly to the address selecting staticisor LST and to the function staticisor FST by way of a normally-closed gate circuit G104 which is controlled by the CL Y-Plate waveform so as to be open only during the negative-going periods of such waveform. The gate G104 is therefore open from the commencement of the beat A1 to the end of beat S2 of each bar and accordingly allows only that negative-going edge of the Halver-A waveform which is coincident with the end of beat A1 to be fed to the function staticisor unit FST to cause its resetting. This rearrangement somewhat simplifies the switching which would otherwise be required, but calls in turn for the routing condition which provides for the transfer between the main store MS and the PI line of the tube 25 in the control unit CL during A1 beats to be built fundamentally in the machine and not by a path which is set up only in response to the specific combinations of function digits. This requirement is met by transferring the connection by which the adding circuit of the control unit CL is supplied from the main store MS to a point on the output from the latter which avoids passage through the outward transfer gate OTG and then inserting a further normally-closed gate circuit G105 in such lead. This further gate circuit G105 is controlled by both the Halver-S and the CL Y-Plate waveforms so as to be open only during the coincidence of the negative-going portions thereof, in other words, during beat A1 only, which is the only period when transfer of an instruction word from the main store MS to the control unit CL is required.

Various other minor differences will be necessary between the operating and control circuits and waveform generation of the present four/five beat machine and those of the earlier four beat machine. These differences will become obvious upon a comparison of the detailed requirements of the two machines and may be accommodated by adaptations and extensions of the circuit technique described above and in said earlier specifications.

Figure 5:
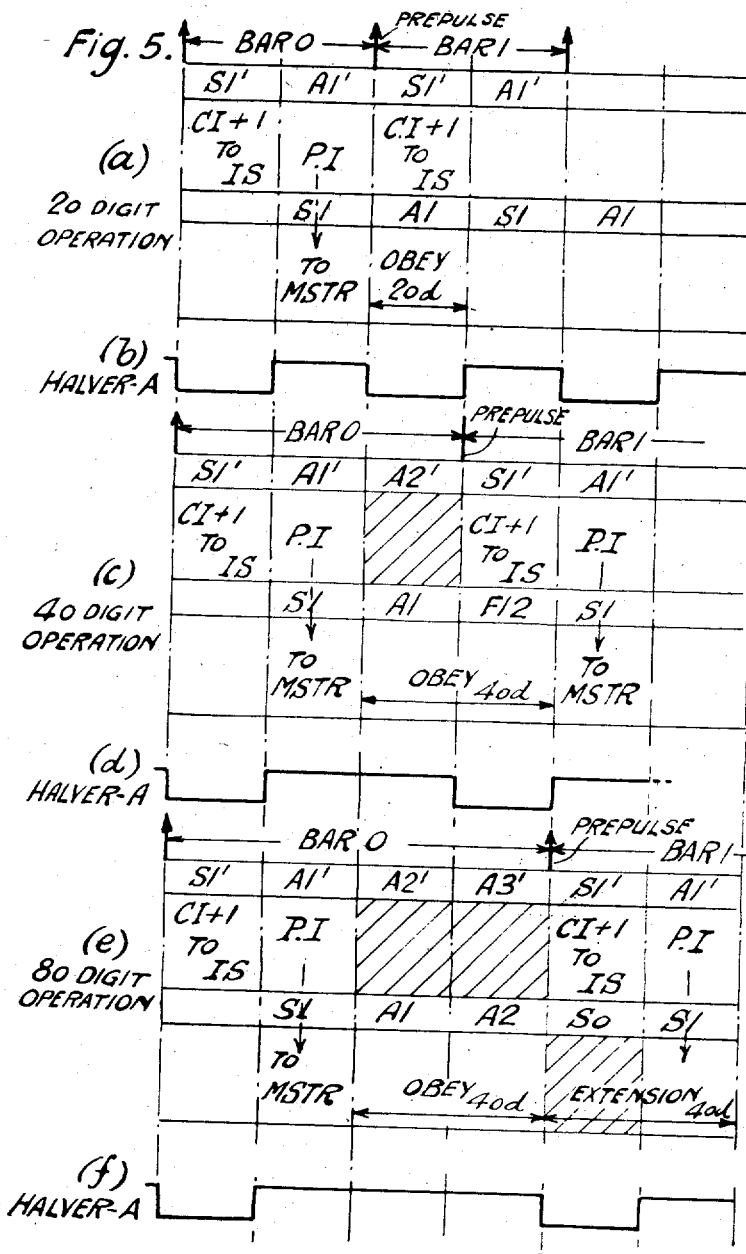
Figure 5 illustrates, in a manner similar to Figure 1, the sequence of events in a two-beat machine according to the invention.
Figure 6:
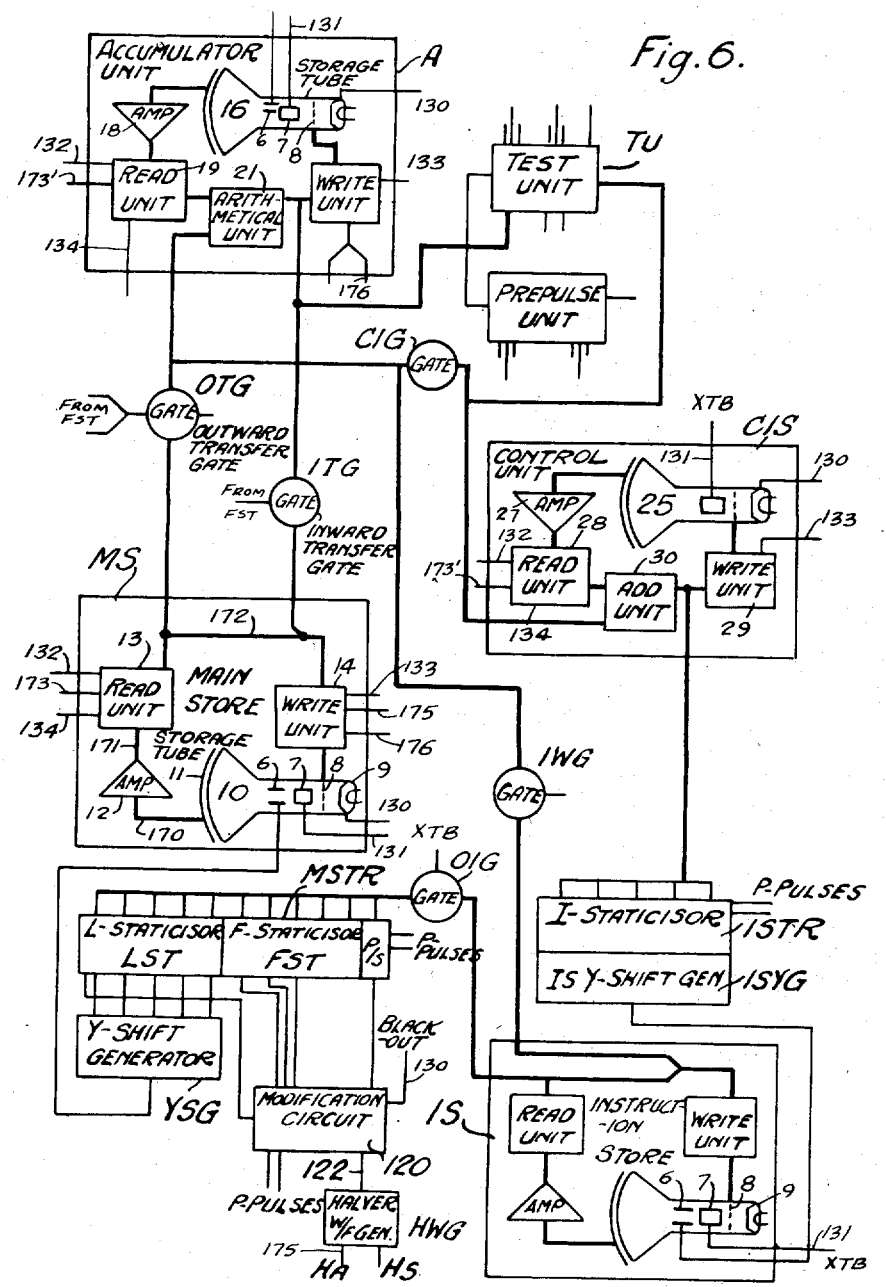
Figure 6 shows, in block schematic form similar to Figures 2a, 2b, the principal elements of a two-beat machine modified in accordance with the present invention.

The application of the invention to machines of the type referred to and which operate upon the two-beat rhythm will now be described with reference to Figs. 5, 6 and 7. Fig. 6 shows, in simplified block schematic form, a two-beat machine which utilises separate number or main and instruction stores MS and IS respectively. The main store MS has its associated staticisor MSTR including an address staticisor unit LST and a function staticisor unit FST arranged substantially as in the previously described four-beat embodiment of the present invention with the facility for stepping-on any address number set up on the unit LST by a chosen number, conveniently unity, under the control of a special function digit in an instruction word. This staticisor MSTR is linked, as before, to a Y-shift generator YSG.

The separate instruction store IS is associated with its own staticisor ISTR and Y-shift generator IYSG while the remaining elements, including the accumulator A, test unit TU, prepulse unit PPU, transfer and controlling gates OTG, ITG, OIG, IWG, and CIG and control unit CIS are all substantially as described in connection with the first embodiment apart from the slight changes referred to later. In the present example, it will be assumed that the various elements are arranged to operate with a beat length accommodating only a 20-digit word instead of a 40-digit word as in the aforesaid earlier version.

Fig. 5(a) indicates the sequence of events occurring during normal operation with 20-digit number words, the beats S1' and A1' referring to the operation of the instruction store IS and the beats S1 and A1 to the operation of the number store MS. The machine operates with interlacing of the scan and action beats in the two stores and the prepulse signals are caused to issue at the end of every S1 or A1' beat, being initiated by the negative-going edges of the Halver-A waveform, shown in Fig. 5(b). The present instruction fed from the instruction store IS to the number store staticisor MSTR during beat A1', S1, is obeyed in the second beat of the number store which coincides, in time, with the first beat of the next bar in the instruction store.

If, now, such a machine is required to handle 40-digit numbers in two 20-digit parts, such two parts are arranged to be held on suitably related, preferably adjacent, addresses in the store MS, and the sequence of events will be rearranged as indicated in Fig. 5(c). Each bar, referred to either store IS or MS, will comprise one scan and two action beats as indicated at S1', A1', A2' and S1, A1, A2 respectively and formed by extending each normal two-beat bar by an additional action beat. The prepulses for initiating each new bar will be released at the end of each A2', A1 beat. The events occurring during the S1', A1' and S1 beats of a bar will be exactly as for the normal two-beat rhythm but the obeying of the instruction, since it involves transference of a 40-digit number, will not be completed within the beat A1 of the store MS but will extend also over the following number store beat A2. The events of the first beat S1' of the next bar, comprising the feeding of the control instruction word CI to the staticisor ISTR, must be delayed by suitable modifications of the Halver waveforms so that only the beat A2 overlaps the following bar. Beat A2' is therefore unused so far as the instruction store IS is concerned. Fig. 5(d) illustrates the modified form of the Halver-A version of the Halver waveforms, and from which it will be seen that the normal change at the end of beat A1', S1 is inhibited, the negative-going edge which initiates the issue of the next prepulse signal being delayed until the end of beat A2'.

If the machine is required to provide the facility of computation with double-length (80-digit) numbers, i. e. by the extraction of a 40-digit number from the store MS and its extension in association with the accumulator A to 80-digit form, the sequence of events becomes that shown in Fig. 5(e). The first three beats of a bar, referred either to the number or to the instruction stores MS or IS are as for the previous case involving a 40-digit word but, in view of the necessity of extending the use of the accumulator A for another two-beats, that beat of the next following bar, namely A1 in which the accumulator may again be required, cannot occur until such additional beats are terminated. This means that only the second of the two extension beats can overlap beat S1 of the next bar with the result that the issue of the prepulse which initiates the next bar must be delayed until a third beat A3' of the instruction store IS has passed, the prepulse occurring at the end of the beat A2 of the number store MS in which the reading of the 40-digit number word is completed. The two beats during which extension to 80-digit form occurs are thus the first two beats, referred to as S0 and S1 of the store MS, of the next following bar. Beats A2', A3' and S0 are unused in their respective stores. The related, modified, form of the Halver-A waveform is shown in Fig. 5(f).

The requisite modifications to the Halver waveford and to effect the requisite stepping-on of the main store staticisor MSTR are carried out by means of the circuit 120 of Fig. 6. This circuit is illustrated in more detailed schematic form in Fig. 7 and is controlled by (a) the condition of that section of the function staticisor unit FST which is assigned to the special digit signalling 40-digit extraction and (b) the presence of the particular combination of output potentials of those further sections of the function staticisor which signal the intention to effect a computation involving extension of a 40-digit number to 80-digit length.

Figure 7:
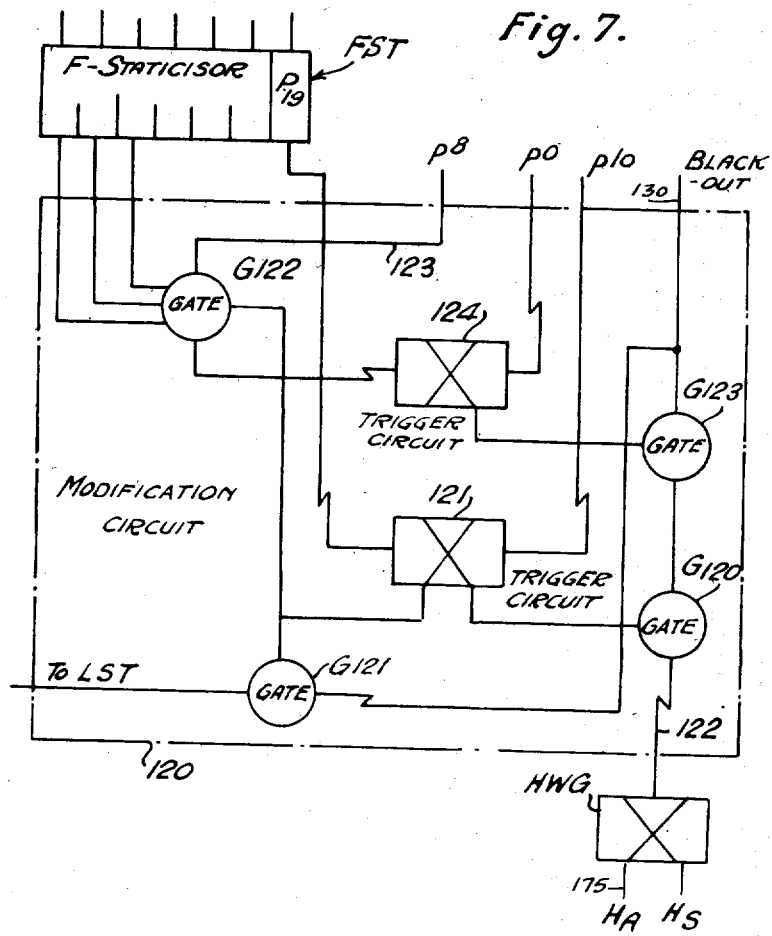
Figure 7 is a more detailed block schematic diagram, similar to Figure 4, showing the modifications of the Halver waveform generating arrangement for the machine of Figure 6.

Referring now to Fig. 7, this circuit 120 comprises a two-state trigger circuit 121 whose triggering input is derived from the last digit section (p19) of the function staticisor unit FST when the latter is set by the preesnce of a "1" digit in that position, signalling the intended extraction of a 40-digit number. This circuit is reset by the p10-Pulse waveform. One of its outputs controls a normally-open gate circuit G120 in the connection 122 by which the Blackout waveform is applied as a triggering input to the Halver waveform generator HWG. Another output of the trigger circuit 121 controls a normally-closed gate circuit G121 by which such Blackout waveform is supplied as a stepping-on trigger input to the address selecting staticisor unit LST.

The particular sections of the function staticisor unit FST which are set by "1" digits to signal the particular computation involving extension of a 40-digit number to 80-digit length provide a part of the control of a further gate circuit G122 which is also controlled by an output connection from the trigger circuit 121. This gate is normally-closed and is in the conductor 123 by which the p8-Pulse waveform is applied as a triggering input to a further two-state trigger circuit 124. The latter is reset by the p0-Pulse waveform and has its output applied as a controlling input to a normally-open gate circuit G123 which is also in series with the connection 122 supplying the Blackout waveform to the Halver waveform generator.

The operation of the arrangement is as follows: when only 20-digit operation is being carried out, gate circuits G121 and G122 remain closed and those of G120 and G123 remain open. In consequence each Blackout pulse is effective upon the Halver waveform generator HWG which consequently reverses at the end of each beat as indicated in Fig. 5(b).

In the event of a 40-digit extraction, the last (p19) section of the staticisor unit FST is set to provide a potential which triggers the circuit 121 towards the end of beat A1', S1. This causes closure of gate circuit G120 until the said circuit is reset by the p10-Pulse of the next beat, thus preventing the application of the intervening Blackout pulse to the Halver waveform generator HWG. In consequence the latter is not triggered at the end of beat A1', S1 and the Halver-A waveform is as shown in Fig. 5(d). The gate circuit G120 is then reopened so that the next following Blackout pulse is effective upon the Halver waveform generator at the end of beat A2', A1.

When an 80-digit extension of a 40-digit extraction is required, the circuit 121 will first be operated as described above to inhibit the change-over of the Halver waveform generator at the end of beat A1', S1. Simultaneously, the gate circuit G122 will be supplied with the necessary controlling potentials from the staticisor unit FST and from the trigger circuit 121 to cause it to open. In consequence, the $p8$-Pulse of beat A2', A1 will become effective upon the trigger circuit 124 and will reverse its setting, thereby causing closure of gate circuit G123. The closure of the latter persists from the $p8$-Pulse of beat A2', A1 until the circuit 124 is reset by the $p0$-Pulse of beat A3', A2 so that the intervening Blackout pulse is also inhibited from access to the Halver waveform generator HWG. The resultant output from the latter is accordingly that shown in Fig. 5($f$).

In the above embodiments the two-state trigger circuits may be of any conventional form such as that illustrated in connection with the staticisor elements while the gate circuits may again be of any convenient form, for instance, of the multiple diode type also used in said staticisor elements.

A variety of modifications may clearly be made without departing from the scope of the invention. For example the requisite modified form of the Halver and other waveforms may be obtained in a manner other than that shown of suppressing triggering of a two-state trigger circuit.

We claim:

1. An electronic digital computing machine of the type operating with the serial form of number representation by an electric pulse signal train occurring within each of a succession of beat time intervals and wherein the coefficient of each digit of the number is signalled by the pulse signal content of the successively occurring digit-intervals of such train and comprising a rhythmically operating main data storage device controlled by a beat timing waveform and having a plurality of separate storage locations for holding both number word and instruction word data items, each of $x$ digits length capable of expression as a pulse train in one beat time interval, a computing organ controlled by said beat timing waveform for performing an arithmetical operation with basic-length number words having a preterminded number of digits $w$ therein, a control system controlled by said beat timing waveform and a bar timing waveform for governing the selection and transfer of number words between said storage device and said computing organ under the control of selected instruction words and timing means including electric waveform generating means providing said beat and said bar defining waveform for defining a normal machine operating rhythm as consisting of a plurality of minor cycles or beats during each major cycle or bar which constitutes the time period required for the obeying of an instruction word to perform a single computation step, said beat defining waveform defining each beat interval as having a number of operative digit-intervals $x$ which is a sub-multiple $n$ of the number of digits $w$ in said basic length number word and said control system including means altering the form of said bar defining waveform for effecting transference of a basic length number word between said main data storage device and said computing organ in $n$ successive beats under the control of a single instruction word.

2. An electronic digital computing machine as claimed in claim 1 in which said control system includes means for providing an extended period of operation of said computing organ during further beats subsequent to the last of said $n$ successive beats.

3. An electronic digital computing machine as claimed in claim 2 in which at least one of said further beats is arranged to overlap a beat of the next following bar of operation of the machine.

4. An electronic digital computing machine of the type operating rhythmically with the serial form of number representation by an electric pulse signal train in each successive beat interval of the machine wherein the value of each successive digit of the number is signalled by the pulse signal content of the $x$ successively occurring digit intervals of such train and comprising a data storage device controlled by a beat defining electric waveform and having a plurality of separate storage locations for holding both number word and instruction word data items, a computing organ controlled by a beat defining electric waveform for performing an arithmetical operation with basic length number words having a predetermined number of digits $w$ therein, a control system controlled by a beat defining electric waveform and a bar defining electric waveform for governing the selection and transfer of number words between said main data storage device and said computing organ under the control of selected instruction words and timing means for defining a normal machine operating rhythm consisting of a plurality of minor cycles or beats during each major cycle or bar which constitutes the time period required for the obeying of an instruction word to perform a single computation step, said timing means including waveform generating means for providing said beat and bar defining waveforms in which each beat interval has a number of operative digit intervals $x$ which is half the number of digits $w$ in said basic length number word and said control system including means for modifying said beat defining waveform for effecting transference of a basic length number word between said main data storage device and said computing organ in two successive beats under the control of a single instruction word.

5. An electronic digital computing machine of the type specified and comprising a main data storage device controlled by a timing electric waveform and having a plurality of separate storage locations for holding both number word and instruction word data items, a computing organ controlled by a timing electric waveform for performing an arithmetical operation with basic length number words having a predetermined number of digits $w$ therein, a control system controlled by a timing electric waveform for governing the selection and transfer of number words between said main storage device and said computing organ under the control of selected instruction words and timing means including electric waveform generating means for providing timing electric waveforms defining a normal machine operating rhythm consisting of four minor cycles or beats during each major cycle or bar which constitutes the time period required for the obeying of an instruction word to perform a single computation step, said timing waveform generating means including means for defining each beat interval as having a number of operative digit intervals which is half the number of digits $w$ in said basic length number word and said control system including means for modifying said timing waveforms for causing extension of said major cycle or bar to include at least five beats to effect transference of a basic length number word between said data storage device and said computing organ in successive beats under the control of a single instruction word.

6. An electronic digital computing machine of the type specified and comprising a main data storage device controlled by electric timing waveforms and having a plurality of separate storage locations for holding number word data items, a subsidiary storage device controlled by said electric timing waveforms for holding instruction word data items, a computing organ controlled by said electric timing waveforms for performing an arithmetical operation with basic length number words having a predetermined number of digits $w$ therein, a control system controlled by said electric timing waveforms for governing the selection and transfer of number words between said main storage device and said computing organ under the control of an instruction word selected from said subsidiary storage device and timing means including electric waveform generating means for providing said timing waveforms for defining a normal machine operating rhythm consisting of two minor cycles or beats during each major cycle or bar which constitutes the time period required for the obeying of an instruction word to perform a single computation step, said timing waveform generating means including means for defining each beat interval as having a number of operative digit intervals which is half the number of digits $w$ in said basic length number word and said control system including means modifying said electric timing waveforms for causing extension of said major cycle or bar to include at least three beats to effect transference of a basic length number word between said data storage device and said computing organ in successive beats under the control of a single instruction word.

7. An electronic digital computing machine of the type specified and comprising a main data storage device controlled by electric timing waveforms and having a plurality of separate storage locations for holding both number word and instruction word data items, a computing organ controlled by said electric timing waveforms for performing an arithmetical operation with basic length number words having a predetermined number of digits $w$ therein, a control system controlled by said electric timing waveforms for governing the selection and transfer of number words between said main storage device and said computing organ under the control of selected instruction words and timing means including waveform generating means providing said timing waveforms for defining a normal machine operating rhythm consisting of three minor cycles or beats during each major cycle or bar which constitutes the time period required for the obeying of an instruction word to perform a single computation step, said timing waveform generating means including means for defining each beat interval as having a number of operative digit intervals which is half the number of digts $w$ in said basic length number word and said control system including waveform modifying means for altering said timing waveforms to cause extension of said major cycle or bar to include at least four beats to effect transference of a basic length number word between said data storage device and said computing organ in successive beats under the control of a single instruction word.

8. An electronic digital computing machine of the kind operating with the serial form of number representation and comprising a main data storage device controlled by electric timing waveforms and having a plurality of separate storage locations for holding both number word and instruction word data items, address selecting mechanism controlled by said timing waveforms and associated with said storage device by which any one of the separate storage locations in said storage device is individually accessible under the control of an applied signal, a computing organ controlled by said timing waveforms for performing an arithmetical operation with pulse signal trains representing basic length number words with a predetermined number of separate digits $w$ therein, a control system controlled by said timing waveforms for providing control signals for governing the selection and transfer of number words between said storage device and said computing organ under the control of selected instruction words, timing means including waveform generating means providing said timing waveforms for defining a normal machine operating rhythm consisting of a plurality of minor cycles or beats during each major cycle or bar which constitutes the time period required for the obeying of an instruction word to perform a single computation step, said timing waveform generating means being constructed to define each beat interval as having an operative number of digit intervals therein which is an exact sub-multiple $n$ of the number of digits $w$ in said basic length number word, said storage locations of said data storage device being arranged to hold a data item of $w/n$ digits length, address altering means in said control system by which said address selecting mechanism of said data storage device may be changed automatically during transference of a basic length number word from the address setting of a storage location holding one part of said number word to the address setting of the storage location recording the next subsequent part of the word whereby said control system is arranged to effect transference of a basic length number word between said data storage device and said computing organ in $n$ successive beats under the control of a single instruction word.

9. An electronic digital computing machine of the kind operating with the serial form of number representation and comprising a main data storage device controlled by electric timing waveforms and having a plurality of separate and successively numbered storage locations for holding both number word and instruction word data items, address selecting mechanism controlled by said timing waveforms and associated with said storage device by which any one of said separate numbered storage locations in said storage device is individually accessible under the control of an applied signal, a computing organ controlled by said timing waveforms for performing an arithmetical operation with pulse signal trains representing basic length number words with a predetermined number of separate digits $w$ therein, a control system controlled by said timing waveforms for providing control signals for governing the selection and transfer of number words between said storage device and said computing organ under the control of selected instruction words, timing means including electric waveform generating means providing said timing waveforms for defining a normal machine operating rhythm consisting of a plurality of minor cycles or beats during each major cycle or bar which constitutes the time period required for the obeying of an instruction word to perform a single computation step, said timing waveform generating means being constructed to define each beat interval as having an operative number of digit intervals therein which is an exact sub-multiple $n$ of the number of digits $w$ in said basic length number word, said storage locations of said data storage device being arranged to hold a data item of $w/n$ digits length, address altering means in said control system by which the number setting of said address selecting mechanism of said data storage device may be changed automatically by a predetermined constant amount during transference of a basic length number word from the address setting of a storage location holding one part of said number word to the address setting of the storage location recording the next subsequent part of the word whereby said control system is arranged to effect transference of a basic length number word between said data storage device and said computing organ in $n$ successive beats under the control of a single instruction word.

10. An electronic digital computing machine as claimed in claim 9 wherein said address selecting mechanism comprises a staticisor device including a number of digit-selecting sections each including a two-state trigger circuit and in which said trigger circuits are interconnected to form a counting circuit and wherein said address altering means includes means for supplying a series of pulses whose number is appropriate to said predetermined constant amount to the first section of said staticisor.

11. An electronic digital computing machine of the kind operating with the serial form of number representation and comprising a main data storage device controlled by electric timing waveforms and having a plurality of separate and successively numbered storage locations for holding both number word and instruction word data items, address selecting mechanism controlled by said timing waveforms and associated with said storage device by which any one of said separate numbered storage locations in said storage device is individually accessible under the control of an applied signal, a computing organ controlled by said timing waveforms for performing an arithmetical operation with pulse signal trains representing basic length number words with a predetermined number of separate digits *w* therein, a control system controlled by said timing waveforms for providing control signals for governing the selection and transfer of number words between said storage device and said computing organ under the control of selected instruction words, timing means including electric waveform generating means providing said timing waveforms for defining a normal machine operating rhythm consisting of a plurality of minor cycles or beats during each major cycle or bar which constitutes the time period required for the obeying of an instruction word to perform a single computation step, said timing waveform generating means being constructed to define each beat interval as having an operative number of digit intervals therein which is an exact sub-multiple $n$ of the number of digits $w$ in said basic length number word, said storage locations of said data storage device being arranged to hold a data item of $w/n$ digits length, address altering means in said control system by which the number setting of said address selecting mechanism of said data storage device may be changed automatically by the amount of unity during transference of a basic length number word from the address setting of a storage location holding one part of said number word to the address setting of the storage location recording the next subsequent part of the word whereby said control system is arranged to effect transference of a basic length number word between said data storage device and said computing organ in $n$ successive beats under the control of a single instruction word.

12. An electronic digital computing machine as claimed in claim 11 wherein said address selecting mechanism comprises a staticisor device including a number of digit-selecting sections each including a two-state trigger circuit and in which said address altering means includes means for supplying a single triggering pulse to the first or lowest significant digit section of said staticisor.

13. An electronic digital computing machine of the kind operating with the serial form of dynamic number representation by electric pulse train signals and comprising a main data storage device of the cathode ray tube type controlled by electric timing waveforms and having a plurality of separate and immediately accessible storage locations for holding both number word and instruction word data items, a computing organ controlled by said timing waveforms for performing an arithmetical operation with pulse signal trains representing basic length number words with a predetermined number of separate digits *w* therein, a control system controlled by said timing waveforms for providing control signals for governing the selection and transfer of number words between said main storage device and said computing organ under the control of selected instruction words, timing means including electric waveform generating means providing a first timing waveform defining a normal machine operating rhythm consisting of a plurality of minor cycles or beats during each major cycle or bar which constitutes the time period required for the obeying of an instruction word to perform a single computation step, said timing waveform generating means being constructed to define each beat interval as having an operative number of digit intervals therein which is an exact sub-multiple $n$ of the number of digits *w* in said basic length number word and a further timing waveform controlled by the output of said first waveform generating means, and said control system including modifying means governed by the form of the selected instruction word for modifying the operation of said first waveform generating means and of the further waveform generating means controlled by said first waveform generating means to extend the number of beats in the bar for the purpose of effecting transference of a basic length number word between said data storage device and said computing organ in $n$ successive beats under the control of said selected instruction word.

14. An electronic digital computing machine as claimed in claim 13 wherein said first waveform generating means comprises an electronic trigger circuit and which includes a source of signals characteristic of the commencement of each beat, circuit means for applying said signals from said source as a triggering medium to said trigger circuit and gate circuit means interposed in said circuit means, said gate circuit means being controlled by said control means to inhibit the application of said triggering medium to effect modification of the operation of said first waveform generating means.

References Cited in the file of this patent

UNITED STATES PATENTS

| | | |
|---|---|---|
| 2,407,320 | Miller | Sept. 10, 1946 |
| 2,604,262 | Phelps | July 22, 1952 |

FOREIGN PATENTS

| | | |
|---|---|---|
| 600,896 | Great Britain | Apr. 21, 1948 |

OTHER REFERENCES

"Proceedings of a Symposium on Large Scale Digital Calculating Machinery," Harvard University Press, Cambridge, Mass., 1948; pages 69–79.

"The Eniac," J. B. Brainerd and T. K. Sharpless Electrical Engineering; Feb. 1948; pages 163–172.

"A Digital Computer for Scientific Applications," C. F. West and J. E. De Turk, Proc. I. R. E. Dec. 1948; pages 1452–1460.